(12) United States Patent
Choi et al.

(10) Patent No.: US 11,180,149 B2
(45) Date of Patent: Nov. 23, 2021

(54) VEHICLE AND METHOD FOR CONTROLLING THE SAME

(71) Applicants: Hyundai Motor Company, Seoul (KR); Kia Motors Corporation, Seoul (KR)

(72) Inventors: Yong Kak Choi, Seoul (KR); Joon Shik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 328 days.

(21) Appl. No.: 16/421,791

(22) Filed: May 24, 2019

(65) Prior Publication Data

US 2020/0148208 A1 May 14, 2020

(30) Foreign Application Priority Data

Nov. 9, 2018 (KR) .......................... 10-2018-0137029

(51) Int. Cl.
*B60W 30/18* (2012.01)
*B60L 7/10* (2006.01)
(Continued)

(52) U.S. Cl.
CPC ......... *B60W 30/18127* (2013.01); *B60K 1/04* (2013.01); *B60L 7/10* (2013.01);
(Continued)

(58) Field of Classification Search
CPC . B60K 1/04; B60K 6/26; B60K 6/387; B60K 6/442; B60K 6/547; B60W 10/08; B60W 10/11; B60W 10/182; B60W 10/196; B60W 20/14; B60W 20/30; B60W 2510/083; B60L 15/2009; B60L 2260/24; B60L 7/10; B60L 7/18; B60Y 2200/91;
(Continued)

(56) References Cited

U.S. PATENT DOCUMENTS

| 5,839,533 A * | 11/1998 | Mikami ................... B60L 7/10 180/165 |
| 6,070,680 A * | 6/2000 | Oyama ................... B60L 50/15 180/65.25 |

(Continued)

*Primary Examiner* — Tyler J Lee
(74) *Attorney, Agent, or Firm* — Morgan, Lewis & Bockius LLP

(57) ABSTRACT

A vehicle includes a motor; a transmission; a battery; a mode input device for receiving a driving mode; a control information input device for receiving regenerative braking control information or gearshift level control information; and a controller configured to control at least one of braking torque of the motor and gearshift level of the transmission to control an amount of regenerative braking during regenerative braking by recognizing a signal received from the control information input device as a signal corresponding to the regenerative braking control information when the driving mode input to the mode input device is a first mode, and control the transmission to control the gearshift level of the transmission by recognizing a signal received from the control information input device as a signal corresponding to the gearshift level control information when the driving mode input to the mode input device is a second mode.

27 Claims, 16 Drawing Sheets

(51) Int. Cl.
*B60W 10/10* (2012.01)
*B60W 50/08* (2020.01)
*B60K 1/04* (2019.01)
*B60W 20/14* (2016.01)
*B60K 6/26* (2007.10)
*B60W 10/196* (2012.01)
*B60W 10/11* (2012.01)
*B60W 10/18* (2012.01)

(52) U.S. Cl.
CPC .......... *B60W 10/11* (2013.01); *B60W 10/182* (2013.01); *B60W 10/196* (2013.01); *B60W 50/082* (2013.01); *B60K 6/26* (2013.01); *B60W 20/14* (2016.01); *B60W 2520/10* (2013.01); *B60W 2540/10* (2013.01); *B60W 2540/12* (2013.01); *B60W 2540/16* (2013.01); *B60W 2710/083* (2013.01); *B60W 2710/1005* (2013.01); *B60W 2710/18* (2013.01); *B60W 2710/186* (2013.01); *B60Y 2200/91* (2013.01); *B60Y 2200/92* (2013.01); *B60Y 2300/18125* (2013.01)

(58) Field of Classification Search
CPC ...... B60Y 2200/92; B60Y 2300/18125; Y02T 10/62; Y02T 10/64; Y02T 10/70; Y02T 10/72
See application file for complete search history.

(56) References Cited

U.S. PATENT DOCUMENTS

| | | | |
|---|---|---|---|
| 9,248,822 B2* | 2/2016 | Hyun | B60W 10/10 |
| 2010/0076657 A1* | 3/2010 | Jinno | B60L 7/14 |
| | | | 701/70 |
| 2011/0144880 A1* | 6/2011 | Enjolras | B60L 15/2009 |
| | | | 701/70 |
| 2012/0144947 A1* | 6/2012 | Herbert | B60K 20/06 |
| | | | 74/473.31 |
| 2015/0006039 A1* | 1/2015 | Hyun | B60W 10/11 |
| | | | 701/48 |
| 2015/0105954 A1* | 4/2015 | Maruyama | B60W 10/06 |
| | | | 701/22 |
| 2015/0291152 A1* | 10/2015 | Mould | B60W 20/19 |
| | | | 701/22 |
| 2016/0121728 A1* | 5/2016 | Huh | B60L 7/18 |
| | | | 701/70 |
| 2016/0129809 A1* | 5/2016 | Umayahara | B60L 58/40 |
| | | | 701/22 |
| 2016/0264003 A1* | 9/2016 | Yokoyama | B60K 6/52 |
| 2017/0096078 A1* | 4/2017 | Shin | B60L 58/20 |
| 2020/0164860 A1* | 5/2020 | Morita | B60W 10/08 |

* cited by examiner

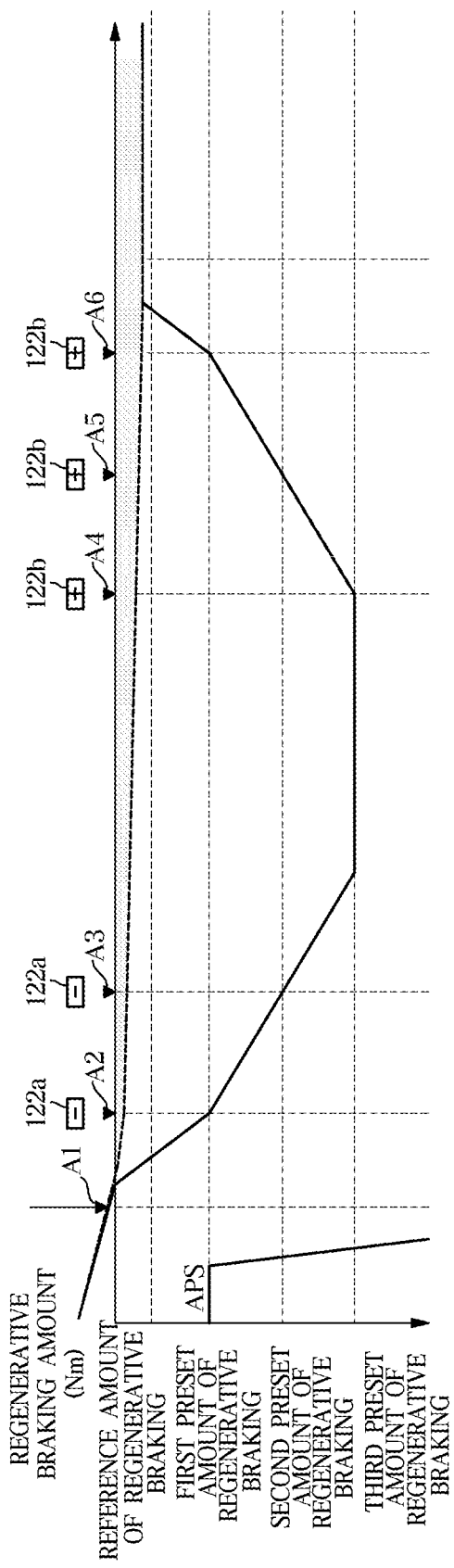

VEHICLE AND METHOD FOR CONTROLLING THE SAME

CROSS-REFERENCE TO RELATED APPLICATION

This application is based on and claims the benefit of priority to Korean Patent Application No. 10-2018-0137029, filed on Nov. 9, 2018 in the Korean Intellectual Property Office, the entire disclosure of which is incorporated herein by reference.

TECHNICAL FIELD

The present disclosure relates to a vehicle and method for controlling the same to improve regenerative braking efficiency.

BACKGROUND

Vehicles are machines driven on wheels to run on the road.

The vehicles include motor vehicles (general engine-driven vehicles) driven with mechanical power produced by burning oil fuel, such as gasoline and diesel, and eco-friendly vehicles driven by electrical power to reduce the amount of harmful fuel emissions and increase fuel efficiency.

The eco-friendly vehicles include electric vehicles having a rechargeable power unit comprised of a battery and a motor, rotating the motor with electricity charged in the battery, driving the wheels using the rotation of the motor, hybrid vehicles driven by having an engine, a battery, and a motor and controlling mechanical power of the engine and electrical power of the motor, and hydrogen fuel cell vehicles.

The hybrid vehicles are driven in an Electric Vehicle (EV) mode using the motor power only, in a Hybrid Electric Vehicle (HEV) mode using both the engine power and the motor power, or in a regenerative braking mode charging the battery by recovering braking energy from braking or inertial energy from coasting by inertia through generating operation of the motor.

SUMMARY

The present disclosure provides a vehicle and method for controlling the same, which switches the function of a control information input device to a function to control an amount of regenerative braking or a function to control the gearshift level based on a driving mode, and controls at least one of a motor and a transmission such that an amount of regenerative braking is controlled based on an input signal of the control information input device when the function of the control information input device is recognized as the function to control the amount of regenerative braking.

The present disclosure also provides a vehicle and method for controlling the same, which changes the function of a control information input device to a function to control an amount of regenerative braking or a function to control the gearshift level based on an input of a function switching input device, and controls at least one of a motor and a transmission such that an amount of regenerative braking is controlled based on an input signal of the control information input device when the function of the control information input device is recognized as the function to control an amount of regenerative braking.

The present disclosure also provides a vehicle and method for controlling the same, which controls operation of an electronic parking brake system for the vehicle to be stopped when a holding signal for increasing the amount of regenerative braking is received from the control information input device when an amount of regenerative braking is the maximum amount of regenerative braking.

In accordance with an aspect of the present disclosure, a vehicle may include a motor; a transmission configured to transmit rotational motion of the motor to a vehicle wheel; a battery configured to supply power to the motor and be charged in regenerative braking; a mode input device configured to receive a driving mode; a control information input device configured to receive regenerative braking control information or gearshift level control information; and a controller. The controller may be configured to: control at least one of a braking torque of the motor and a gearshift level of the transmission to control a regenerative braking amount during the regenerative braking by recognizing a signal received from the control information input device as a signal corresponding to the regenerative braking control information when the driving mode received by the mode input device is a first mode, and control the transmission to control the gearshift level of the transmission by recognizing a signal received from the control information input device as a signal corresponding to the gearshift level control information when the driving mode input received by the mode input device is a second mode.

The control information input device may include a first control information input device and a second control information input device arranged on a steering wheel and separated from each other by a certain distance.

The controller may be configured to, while the driving mode is the first mode: increase the braking torque of the motor such that the regenerative braking amount increases, when a first manipulation signal is received from the first control information input device, and reduce the braking torque of the motor such that the regenerative braking amount decreases, when a second manipulation signal is received from the second control information input device.

The controller may be configured to, while the driving mode is the first mode: when a first manipulation signal is consecutively received from the first control information input device for more than a preset amount of time, gradually increase the braking torque of the motor such that the regenerative braking amount increases to a preset amount of regenerative braking corresponding to the preset amount of time for which the first manipulation signal is consecutively received, and when a second manipulation signal is consecutively received from the second control information input device for more than a preset amount of time, gradually reduce the braking torque of the motor such that the regenerative braking amount gradually decreases. The controller gradually increases the braking torque of the motor such that the regenerative braking amount increases to a first preset amount of regenerative braking when the first manipulation signal is consecutively received for more than a first preset amount of time, and the controller gradually increases the braking torque of the motor such that the regenerative braking amount increases to a second preset amount of regenerative braking, which is different from the first preset amount of regenerative braking, when the first manipulation signal is consecutively received for more than a second preset amount of time.

The controller may, when the regenerative braking amount increased depending upon the preset amount of time for which the first manipulation signal is consecutively received reaches a maximum amount of regenerative braking, stop increasing and maintain the regenerative braking amount at the maximum amount of regenerative braking, and when the regenerative braking amount reduced depending upon the preset amount of time for which the second manipulation signal is consecutively received reaches a reference amount of regenerative braking, stop reducing and maintain the regenerative braking amount at the reference amount of regenerative braking.

The controller may control the transmission to reduce the gearshift level when a first manipulation signal is received from the first control information input device when the driving mode is the second mode, and control the transmission to increase the gearshift level when a second manipulation signal is received from the second control information input device.

The controller may set a target regenerative braking power to a reference regenerative braking power until a manipulation signal is received from the control information input device during the regenerative braking and control braking torque of the motor based on the set reference regenerative braking power.

The vehicle may further include a transmission lever manipulated to an up-shift level or a down-shift level; and a lever signal receiver to receive a first manipulation signal corresponding to the down-shift level and a second manipulation signal corresponding to the up-shift level, and the controller may control the transmission to reduce the gearshift level when receiving the first manipulation signal and control the transmission to increase the gearshift level when receiving the second manipulation signal.

The vehicle may further include a function switching input device, and when an ON signal is received from the function switching input device, the controller controls the braking torque of the motor to increase the regenerative braking amount during the regenerative braking by recognizing the first manipulation signal corresponding to the down-shift level as a signal of increasing the regenerative braking amount, and controls the braking torque of the motor to reduce the regenerative braking amount during the regenerative braking by recognizing the second manipulation signal corresponding to the up-shift level as a signal of reducing the regenerative braking amount.

The controller may, when a function switching release signal is received, recognize a signal received from the control information input device as a signal corresponding to gearshift level control information and recognize a signal from the transmission signal receiver as a signal corresponding to gearshift level control information.

The controller may, when a function switching release signal is received, recognize a signal received from the control information input device as a signal corresponding to gearshift level control information.

The vehicle may further include a detector configured to detect pressure applied on each of an accelerator pedal and a brake pedal, and the controller may control regenerative braking when determining based on information detected by the detector that the accelerator pedal and the brake pedal are not in a pressed state.

The vehicle may further include a detector for detecting driving speed, and the controller may determine based on information detected by the detector whether the vehicle is in a stopped state, determine whether a signal of increasing the regenerative braking amount is consecutively received from the control information input device for more than a preset amount of time when the vehicle is determined to be in the stopped state, and control operation of an electronic parking brake system when it is determined that the signal of increasing the regenerative braking amount is received from the control information input device for more than the preset amount of time.

While the driving mode is the first mode, when the first manipulation signal is received from the first control information input device, the controller may control operation of the transmission to increase deceleration based on a first preset gearshift pattern such that the regenerative braking amount increases, and when the second manipulation signal is received from the second control information input device, the controller may control operation of the transmission to reduce deceleration based on a second preset gearshift pattern such that the regenerative braking amount decreases.

While the driving mode is the first mode, when the first manipulation signal is received from the first control information input device, the controller may control operation of the transmission to gradually increase deceleration based on a preset amount of time for which the first manipulation signal is consecutively received such that the regenerative braking amount gradually increases, and when the second manipulation signal is received from the second control information input device, the controller may control operation of the transmission to gradually reduce deceleration based on a preset amount of time for which the second manipulation signal is consecutively received such that the regenerative braking amount gradually decreases.

The controller may control the transmission to reduce the gearshift level of the transmission during the regenerative braking based on a period of time for which regenerative braking is performed.

The controller may control the transmission to reduce the gearshift level of the transmission during the regenerative braking based on a target amount of regenerative braking.

The controller may control the transmission to reduce the gearshift level of the transmission whenever a signal of increasing the regenerative braking amount is received from the control information input device during the regenerative braking.

In accordance with another aspect of the present disclosure, a vehicle may include a motor coupled to a vehicle wheel; a battery configured to supply power to the motor and be rechargeable; a control information input device configured to receive regenerative braking control information; and a controller configured to set a target amount of regenerative braking to a reference amount of regenerative braking during deceleration or braking, set the target amount of regeneration braking to a preset amount of regenerative braking higher than the reference amount of regenerative braking when receiving a manipulation signal from the control information input device, and control braking torque of the motor based on the set target amount of regenerative braking.

The control information input device may include a first control information input device and a second control information input device arranged on a steering wheel and separated from each other by a certain distance, and the controller may increase braking torque of the motor to increase an amount of regenerative braking when a first manipulation signal is received from the first control information input device, and reduce braking torque of the motor to reduce an amount of regenerative braking when a second manipulation signal is received from the second control information input device.

The controller may, when the first manipulation signal is consecutively received from the first control information input device for more than a preset amount of time, gradually increase the braking torque of the motor such that the regenerative braking amount gradually increases to a preset amount of regenerative braking corresponding to the preset amount of time for which the first manipulation signal is consecutively received, and when the second manipulation signal is consecutively received from the second control information input device for more than a preset amount of time, gradually reduce the braking torque of the motor such that the regenerative braking amount gradually decreases.

The controller may, when the regenerative braking amount increased depending upon the preset amount of time for which the first manipulation signal is consecutively received reaches a maximum amount of regenerative braking, stop increasing and maintain the regenerative braking amount at the maximum amount of regenerative braking; and when the regenerative braking amount reduced depending upon the preset amount of time for which the second manipulation signal is consecutively received reaches a reference amount of regenerative braking, stop reducing and maintain the regenerative braking amount at the reference amount of regenerative braking.

In accordance with another aspect of the present disclosure, a method for controlling a vehicle having a motor, a transmission, and a battery includes steps of controlling a regenerative braking amount during regenerative braking by recognizing a signal received from a first or second control information input device arranged on a steering wheel as a signal corresponding to regenerative braking control information, when a driving mode is a first mode; and controlling a transmission to control a gearshift level of the transmission by recognizing a signal received from the first or second control information input device as a signal corresponding to gearshift level control information, when a driving mode is a second mode.

The step of controlling the regenerative braking amount may include at least one of a step of increasing braking torque of the motor or a step of reducing the gearshift level of the transmission such that the regenerative braking amount increases, when a first manipulation signal is received from the first control information input device; and a step of reducing the braking torque of the motor such that the regenerative braking amount decreases, when a second manipulation signal is received from the second control information input device.

The step of controlling the regenerative braking amount may include, when a first manipulation signal is consecutively received from the first control information input device for more than a preset amount of time, gradually increasing the regenerative braking amount to a preset amount of regenerative braking corresponding to the preset amount of time for which the first manipulation signal is consecutively received, and when a second manipulation signal is consecutively received from the second control information input device for more than a preset amount of time, gradually reducing the regenerative braking amount.

The method may further include, when an ON signal is received from a function switching input device, increasing the regenerative braking amount during the regenerative braking by recognizing a first manipulation signal corresponding to a down-shift level of a transmission lever as a signal of increasing the regenerative braking amount; and reducing the regenerative braking amount during the regenerative braking by recognizing a second manipulation signal corresponding to an up-shift level of the transmission lever as a signal of reducing the regenerative braking amount.

The method may further include determining based on information detected by a detector whether the vehicle is in a stopped state; determining whether a first manipulation signal is consecutively received from the control information input device for more than a preset amount of time when the vehicle is determined to be in the stopped state; and controlling operation of an electronic parking brake system when it is determined that the first manipulation signal is consecutively received from the control information input device for more than the preset amount of time.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 4 shows the amount of regenerative braking controlled in response to manipulations of a control information input device of a vehicle, according to an embodiment of the present disclosure;

Figure 1:
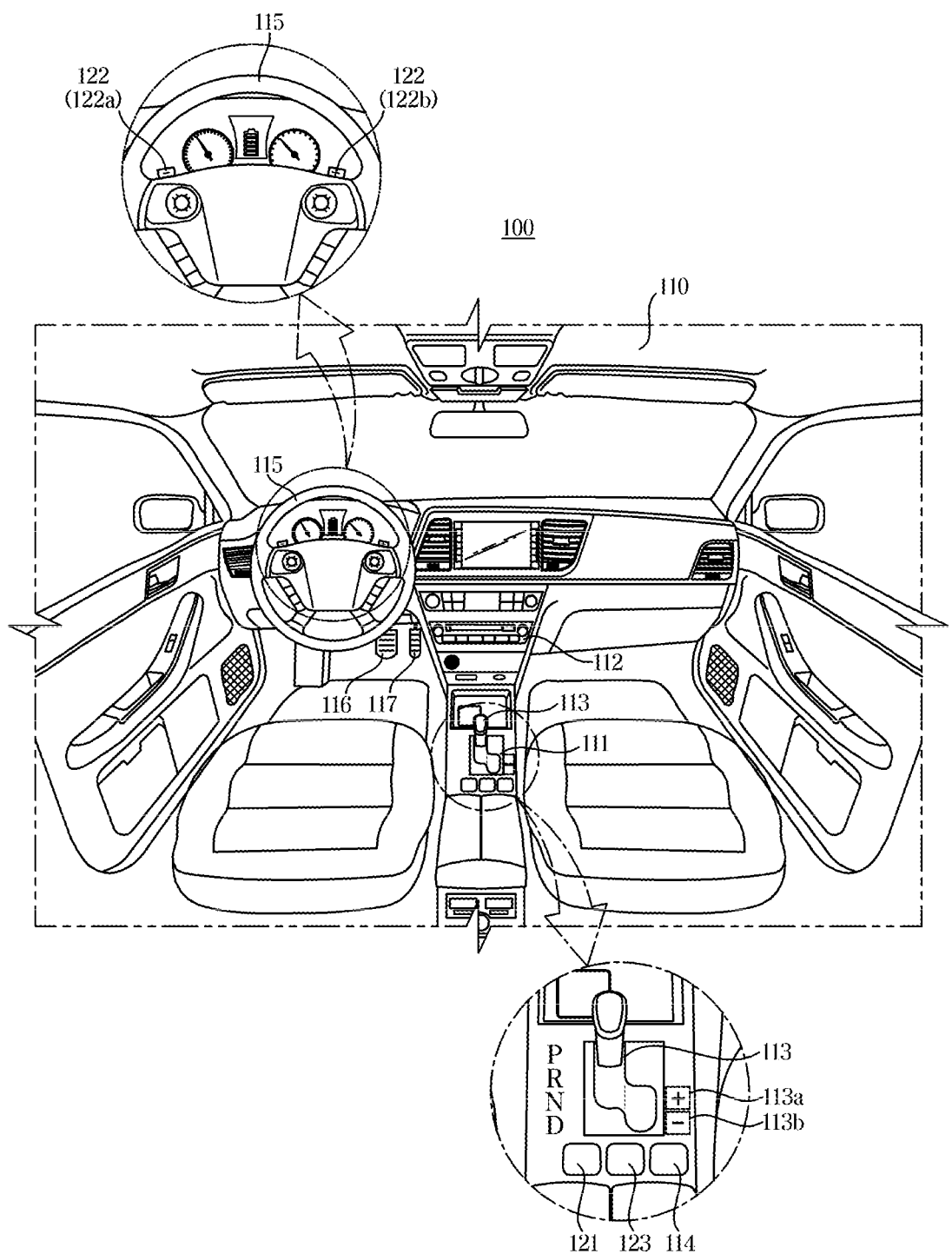
FIG. 1 shows the interior of a vehicle, according to an embodiment of the present disclosure.

It is to be understood that the appended drawings are not necessarily drawn to scale, and are presenting a somewhat simplified representation of various features illustrative of the basic principles of the disclosure. The specific design features of the present disclosure as disclosed herein, including, for example, specific dimensions, orientations, locations, and shapes will be determined in part by the particularly intended application and use environment.

DETAILED DESCRIPTION OF EXEMPLARY EMBODIMENTS

Exemplary embodiments of the present disclosure will now be described with reference to accompanying drawings.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~unit", "~module", "~member", "~block", "~device", etc., may be implemented in software and/or hardware, and a plurality of "~parts", "~units", "~modules", "~members", "~devices", or "~blocks" may be implemented in a single element, or a single "~part", "~unit", "~module", "~member", "~device", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present disclosure will now be described with reference to accompanying drawings.

Figure 2:
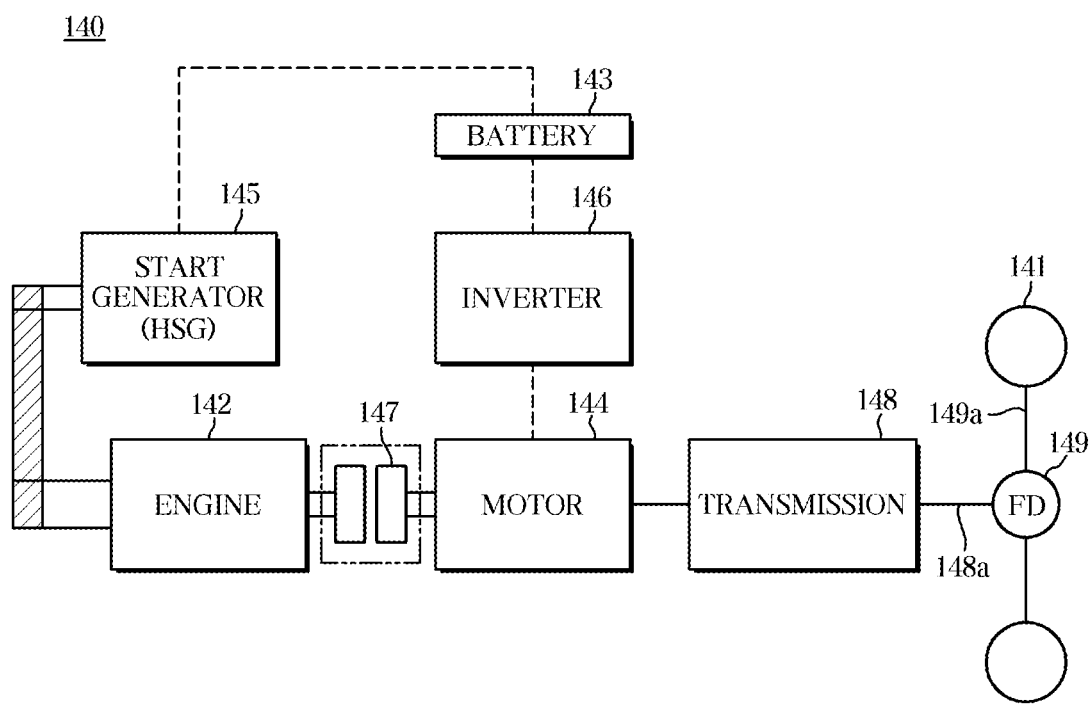
FIG. 2 is a block diagram of a power system of a vehicle, according to an embodiment of the present disclosure.

FIG. 1 shows the interior of a vehicle, according to an embodiment of the present disclosure, and FIG. 2 is a block diagram of a power system of a vehicle, according to an embodiment of the present disclosure.

A vehicle in accordance with the embodiment is an eco-friendly vehicle, which may be one of an electric vehicle having a rechargeable power device comprised of a battery and a motor, rotating the motor with electricity stored in the battery, and driving the wheels using the rotation of the motor, a hybrid vehicle driven by having an engine, a battery, and a motor and controlling mechanical power of the engine and electrical power of the motor, and a hydrogen fuel cell vehicle.

The hybrid vehicle may include a hybrid vehicle without a plug, i.e., Hybrid Electric Vehicle (HEV), or a hybrid vehicle with a plug, i.e., Plug-in Hybrid Electric Vehicle (PHEV). In the embodiment, the plug-less hybrid vehicle will be focused as an example.

A vehicle 100 in accordance with the embodiment includes a vehicle body with an exterior part and an interior part 110, and remaining part, i.e., chassis, on which mechanical devices required for driving are installed.

Referring to FIG. 1, the interior part 110 of the body includes seats for people to sit thereon, a dashboard, a cluster placed on the dashboard containing gauges and indicators, such as a tachometer, speedometer, water temperature gauge, fuel gauge, turn signal indicator, head light indicator, warning light, seat belt warning light, odometer, gearshift position indicator, door open warning light, low fuel warning light, low oil pressure warning light, etc., a center fascia 111 having air vents and throttle of an air conditioner (AC) arranged thereon, and a head unit 112 placed on the center fascia 111 for receiving commands to operate the AC and the audio system.

The vehicle 100 may further include a transmission lever 113, which is a gearshift input device arranged on the center fascia 111, the manipulation position of the transmission lever 113 being changed by a driver according to a driving condition and thus a gearshift mode being received by the transmission lever 113, and an electronic parking brake system (EPB) button 114 placed around the transmission lever 113 or on the head unit 112 for receiving a command to operate the EPB button 114.

The vehicle 100 may include a steering wheel 115 of the steering system for controlling the driving direction, a brake pedal 116 pushed by the user who has intention of braking, and an accelerator pedal 117 pushed by the user who has intention of acceleration.

The vehicle 100 may further include an input device 120 for receiving commands to operate various functions.

The input device 120 may be arranged on the head unit 112, center fascia 111, and steering wheel 115 and may include at least one mechanical button, such as ON/OFF buttons for operation of various functions, buttons to change settings of various functions, etc.

The input device 120 may further include a jog dial (not shown) or a touch pad (not shown).

The input device 120 may include a mode input device 121 for receiving a driving mode and a control information input device 122 for receiving gearshift information and regenerative braking information.

The control information input device 122 may include a first control information input device 122a to increase braking power and reduce the gearshift level, and a second control information input device 122b to reduce braking power and increase the gearshift level.

The mode input device 121 may be arranged on the center fascia 111, and especially arranged around the transmission lever 113 or on the head unit 112.

The control information input device 122 may also be arranged on the steering wheel 115. The control information input device 122 may be provided as paddles.

Specifically, the control information input device 122 may include first and second paddles separated by a certain distance.

More specifically, the first control information input device 122a may be provided as the first paddle located on the left of the steering wheel 115, and the second control information input device 122b may be provided as the second paddle located on the right of the steering wheel 115.

Furthermore, the vehicle may receive a gearshift mode corresponding to a manipulation position of the transmission lever 113 and gearshift information corresponding to a gearshift level from manipulation of the transmission lever 113.

Alternatively, the vehicle may include a gearshift input device for receiving a gearshift mode and gearshift information corresponding to a gearshift level. The gearshift input device may receive a manipulation signal corresponding to an up-shift level and a manipulation signal corresponding to a down-shift level. The transmission lever, which is the gearshift input device, may be implemented as an alternative gearshift button or gearshift switch.

The input device 120 may further include a function switching input device 123 for switching the function of the control information input device 122.

With the function switching input device 123, when the function switching input device 123 is on, the vehicle switches the function of the control information input device 122 to a function to control regenerative braking and switches the function to manipulate the transmission lever 113 to be shifted to the up/down-shift level 113a, 113b to the function to control regenerative braking; when the function switching input device 123 is off, the vehicle switches the function of the control information input device 122 to a function to control the gearshift level and switches the function to manipulate the transmission lever 113 to be shifted to the up/down-shift level 113a, 113b to the function to control the gearshift level.

The vehicle 100 may further include a display 130 arranged in the head unit 112 for displaying information about an activated function and information input by the user.

The display 130 may display one of an Electric Vehicle (EV) mode, a Hybrid Electric Vehicle (HEV) mode, and a regenerative braking mode to correspond to a driving condition of the engine and motor of the vehicle.

The display 130 may display a driving mode corresponding to a first mode, a second mode, and/or a third mode. The first mode may be an eco mode, which is a driving mode capable of controlling regenerative braking, and the second mode may be a sports mode, which is a driving mode incapable of controlling regenerative braking. The third mode may be a normal mode, which is a driving mode incapable of controlling regenerative braking.

The sports mode may consume more power than the eco mode, and maximize the driving power. The eco mode may limit the highest speed per hour to a preset speed per hour to maximize the traveling distance and minimize operation of an air conditioner, and the normal mode may be a basic driving mode of the hybrid vehicle.

The display 130 may display an amount of charge of a battery, a gearshift mode and gearshift level corresponding to a position of the transmission lever 113.

The gearshift mode may include a parking mode P where the transmission is locked and the transmission lever 113 is positioned to park or turn on the ignition, a reverse mode R where the transmission lever 113 is positioned to reverse the vehicle, a drive mode D where the transmission lever is positioned to drive the vehicle forward, and a neutral mode N where the transmission lever 113 is positioned to put the vehicle in a neutral state where the vehicle is not put in gear.

The chassis 140 of the vehicle 100 is a frame to support the vehicle body, having vehicle wheels 141 equipped at front and rear and on the left and right of the vehicle, power systems 142 to 149 to generate power for driving the vehicle 100 and control and apply the generated power to the vehicle wheels 141, a brake system for applying braking force to the vehicle wheels 141, a steering system, and a suspension system arranged thereon.

The vehicle may further include a hydraulic brake system (not shown) as a brake system, which generates hydraulic pressure based on a control instruction of the controller 160 and uses the hydraulic pressure to apply braking force to the vehicle wheels 141.

As shown in FIG. 2, the power system of the vehicle may include an engine 142, a fuel system (not shown), a cooling system (not shown), a refueling system (not shown), a battery 143, a motor 144, a starter generator 145, an inverter 146, a clutch 147, a transmission 148, and a final reduction and differential gear 149, and further include an actuator (not shown) for driving the clutch 147.

In this embodiment, a power system having a parallel structure, in which both the engine 142 and the motor 144 are connected to an axle 149a of the vehicle to drive the vehicle at the same time, will be focused, for example.

The engine 142 burns oil fuel, such as gasoline and diesel to generate mechanical power, and transfers the power to the clutch 147.

The battery 143 produces power with high-tension current, and supplies the power to the motor 144, generator 145, and various kinds of electric devices in the vehicle.

The battery 143 may be charged by receiving the power supplied from the starter generator 145.

The motor 144 generates turning force (also called rotation power) using electric energy from the battery 143, and transmits the turning force to the vehicle wheels 140 to drive the vehicle wheels 140.

Once connected to the engine 142 by the clutch 147, the motor 144 transmits its turning force along with the turning force of the engine 142 to the vehicle wheels 141. The motor 144 may also perform a function of absorbing a shock from closing of the clutch 147 while performing a function of the conventional torque converter.

The motor 144 operates as a generator in a regenerative braking mode due to braking, deceleration, or low-speed driving, enabling the battery 143 to be charged.

The starter generator 145, e.g., a Hybrid Starter Generator (HSG), may be connected to a crank shaft of the engine 142, engaged with the crank shaft of the engine 142 and may operate as a starter motor when the engine 132 is started, and may operate as a generator by the engine 142 to enable the battery 143 to be charged when the vehicle wheels 141 are not driven by the engine 142.

In other words, the starter generator 145 may act as a generator by the power transmitted through the engine 142, enabling the battery 143 to be charged.

The vehicle may also charge the battery 143 by receiving and using power from a charger located in a parking lot or a charging station.

The power system of the vehicle may further include a power converter (not shown) for converting the power generated by the starter generator 145 to rechargeable power for the battery 143. The power converter may be a converter.

The power converter may also perform a function to change the direction and output of a current between the starter generator 145 and the battery 143.

The power converter may also convert the power generated by the motor 144 to rechargeable power for the battery 143 and convert the power of the battery 143 to driving power for various devices in the vehicle.

The power converter may also perform a function to change the direction and output of a current between the motor 144 and the battery 143.

The inverter 146 converts the power from the battery 153 to driving power for the motor 144.

The inverter 146 may also convert the power of the battery 143 to driving power for the starter generator 145.

The inverter 146 outputs the driving power for the motor 144 based on a target vehicle speed from a user instruction. The driving power for the motor 144 may be a switching signal to output a current corresponding to the target vehicle speed and a switching signal to output a voltage corresponding to the target vehicle speed. Accordingly, the inverter 146 may include a plurality of switching devices.

The clutch 147 may be arranged between the engine 142 and the motor 144.

The clutch 147 may be closed or locked when both the engine 142 and the motor 144 are used to generate driving power for the vehicle wheels 141, and may be opened by a spring (not shown) pushed back by the hydraulic pressure produced by driving of the actuator 149, e.g., a Hydraulic Clutch Actuator (HCA), when the driving power for the vehicle wheels 141 is generated using the motor 144 only.

In the EV mode where the vehicle is driven only by the motor 144, the vehicle having the clutch 147 opens the clutch 147 to prevent the motor 144 and the engine 142 from being mechanically connected in order to transmit the rotation of the motor 144 directly to the transmission 148. The engine 142 may be driven off at this time, and may be driven on while the battery is being charged.

Furthermore, the vehicle 100 closes the clutch 147 when driven by operation of both the engine 142 and the motor 144 (in the HEV mode), in order for turning force of the engine 142 to be added to the turning force of the motor 144 and then transmitted to the transmission 148.

Even while the vehicle 100 is driven only by the engine 142, the vehicle 100 closes the clutch 147 for the engine 142 to be rotated together with the motor 144 because the engine 142 needs to be connected to the axle.

The transmission 148 transmits turning motions of the engine 142 and motor 144 to the vehicle wheels 141, or transmits a turning motion of the motor 144 to the vehicle wheels 141. The transmission 148 may be a dual clutch transmission (DCT) that uses two clutches to manipulate the gearshift level.

The transmission 148 automatically performs optimal torque conversion by enabling the gearshift level to be automatically manipulated based on driving speed of the vehicle.

The transmission 148 controls the gearshift level based on manipulation of the transmission lever to the up/down-shift level.

The vehicle may further include the final reduction and differential gear (FD) 149 arranged between the transmission 148 and the vehicle wheels 141 to convert revolutions per minute (rpm) of the motor so that the driving speed of the vehicle reaches the target speed.

The target speed as herein used may be a speed corresponding to the pressure on the accelerator pedal 117 or brake pedal 116.

The target speed may the speed that corresponds to regenerative braking control information input through the control information input device 122.

Figure 3:
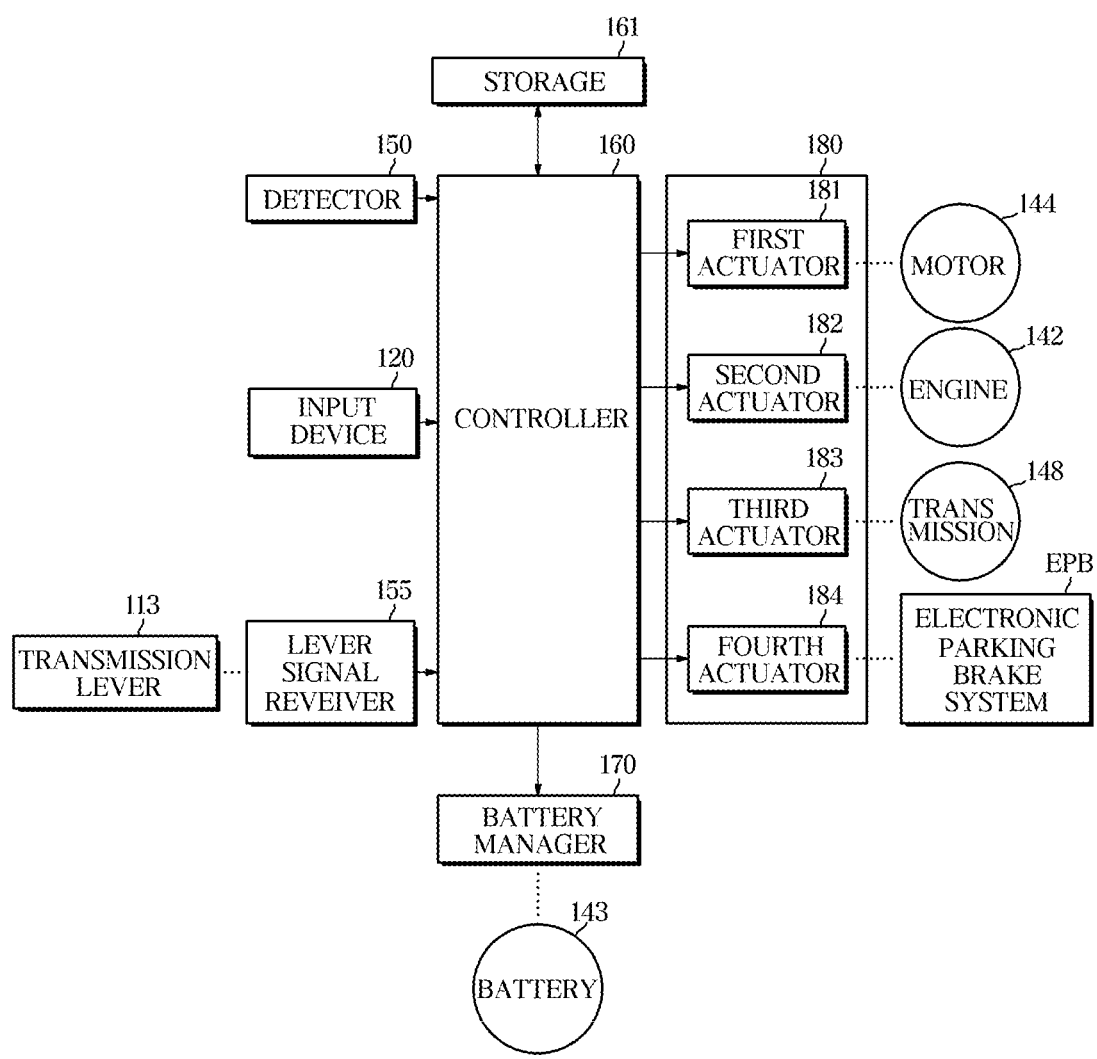
FIG. 3 is a control block diagram of a vehicle, according to an embodiment of the present disclosure.

FIG. 3 is a control block diagram of a vehicle, according to an embodiment of the present disclosure.

A vehicle 100 may include an input device 120, a detector 150, a lever signal receiver 155, a controller 160, a storage 161, a battery manager 170, and one or more actuators 180.

The input device 120 may include the mode input device 121 for receiving a driving mode and the control information input device 122 for receiving gearshift information and regenerative braking information.

The control information input device 122 may include the first control information input device 122a to increase braking power and increase the gearshift level, and a second control information input device 122b to reduce braking power and reduce the gearshift level.

The input device 120 may further include a function switching input device 123 for switching the function of the control information input device 122.

The input device 120 sends a user input entered by the user to the controller 160.

The detector 150 may include a first pressure sensor for detecting pressure applied on the brake pedal 116, and a second pressure sensor for detecting pressure applied on the accelerator pedal 117.

The detector 150 may further include a temperature sensor for detecting temperature of the clutch.

The detector 150 may further include a speed sensor for detecting driving speed of the vehicle.

The speed sensor may include wheel speed sensors attached onto the vehicle wheels 141 each to detect the rotation speed of the wheel, and may include an acceleration sensor for detecting acceleration speed of the vehicle.

A transmission signal receiver, which is a lever signal receiver 155, may be a hardware device implemented with various electronic circuits to receive a signal of a lever position corresponding to a manipulation position of the transmission lever 113 and sends the received signal of the lever position to the controller 160.

The lever signal receiver 155 may receive a D level signal corresponding to the D level position, a P level signal corresponding to the P level position, an N level signal corresponding to the N level position, an R level signal corresponding to the R level position, an up-shift signal corresponding to the up-shift level (+) position 113a, and a down-shift signal corresponding to the down-shift level (−) position 113b.

The transmission signal receiver may receive information corresponding to a gearshift mode and gearshift level from the transmission button or transmission switch.

The controller 160 may obtain required power of the user based on at least one of current driving speed of the vehicle, information about pressure applied to accelerator pedal 117, information about pressure applied to brake pedal 116, and control information input to the control information input device 122, obtain target driving speed corresponding to the required power of the user, and control operation of at least one of the motor 144 and the engine 142 based on the target driving speed.

Accordingly, the vehicle 100 may be driven by the power generated by the at least one of the engine 142 and the motor 144.

The controller 160 may determine whether a currently required operation is accelerating, braking, slowing down or gear shifting based on at least one of the information about pressure applied on the accelerator pedal 117, the information about pressure applied on the brake pedal 116, and gearshift information input to the transmission lever 113, and control operation of at least one of the motor 144, the engine 142, the transmission 148, and the hydraulic brake system based on the required operation.

The controller 160 may control the vehicle to perform the EV mode using the power of the motor 144 only or the HEV mode using the power of both the motor 142 and the engine 142, based on the target driving speed for the vehicle, whether the vehicle is accelerated, and/or whether the vehicle is climbing the hill.

Upon receiving the information about pressure on the brake pedal 116 through the detector 150, the controller 160 may obtain braking power required by the driver based on speed and frequency at which the brake pedal 116 is pushed, perform reference regenerative braking within a range of the obtained braking power, and complement the rest of the braking power by controlling the hydraulic brake system.

In other words, the controller 160 uses the motor to reduce the speed when less than the reference braking power is required, and controls the hydraulic brake system when more than the reference braking power is required.

The speed at which the brake pedal is pushed may be acquired according to a time of detection of the pressure and a change in the pressure when the brake pedal is pushed.

The vehicle may move by creep torque while the accelerator pedal is not pushed. The creep torque refers to torque of the motor 144 produced while the driver is not pushing the accelerator pedal 117, i.e., driving torque of the vehicle while the accelerator pedal is not operated.

In this case, when determining that the vehicle is driving by the creep torque, the controller 160 may obtain target creep torque based on the rotation speed of the motor 144 and a gradient of the road, control operation of the motor 144 based on the obtained target creep torque, and control operation of the motor 144 based on the information about pressure on the brake pedal detected by the detector 150 when the brake pedal is pushed.

This may allow the vehicle to detect operation of the brake pedal and reduce the creep torque, thereby reducing consumption of the power of the battery 143.

The controller 160 may control operation of the EPB based on input information of the EPB button 114.

When the pressure of the accelerator pedal 117 is released, the controller 160 may control operation of the motor 144 to reduce the rotation speed of the motor 144 and control operation of the transmission 148 to reduce the gearshift level of the transmission 148.

Reducing the gearshift level of the transmission 148 may include increasing braking torque of the motor 144 to increase the amount of deceleration.

When determining that neither the brake pedal nor the accelerator pedal is pushed, the controller 160 may determine that the vehicle is coasting, then determine target regenerative torque based on the rotation speed of the motor 144 and the road gradient and control the motor 144 based on the target regenerative torque. The target regenerative torque is less than reference regenerative torque.

The controller 160 may charge the battery 143 when the regenerative torque is produced by the motor 144 during the coasting. The regenerative torque refers to the torque of the motor 144 that charges the battery 143 and corresponds to the amount of regenerative braking during regenerative braking.

The target regenerative torque may have a value of data experimentally obtained depending on the speed of the motor 144, and the reference regenerative torque may have a preset value.

A reference amount of regenerative braking has a value corresponding to the reference regenerative torque, which may be set in advance.

The controller 160 may control the motor 144 to operate as a generator to perform regenerative braking during the coasting.

When the brake pedal 116 is pushed, the controller 160 controls the motor 144 to operate as a generator by controlling the operation of the motor 144 such that the force acting on the motor 144 may work in the counter direction.

Specifically, when the motor 144 is used to generate braking power, the controller 160 may control the motor 144 to operate as a generator by cutting off power applied to the motor 144 and controlling a first actuator 181 to have a current applied to the motor 144 flowing in the reverse direction. The rotation direction of the motor 144 is not changed due to the inertial force.

When determining that it is time to change gears while performing acceleration, deceleration, constant-speed driving, and braking, the controller 160 controls operation of the transmission.

The controller 160 may determine a driving mode based on information input through the mode input device 121. For example, if the signal input through the mode input device 121 corresponds to the second mode, the controller 160 recognizes the driving mode as the second mode and switches the function of the control information input device 122 to the function to control the gearshift level.

Specifically, the controller 160 may switch the function of the first control information input device 122a to the function to shift down the gearshift level, and switches the function of the second control information input device 122b to the function to shift up the gearshift level.

More specifically, while the driving mode is the second mode, when a first manipulation signal is input from the first control information input device 122a, the controller 160 may control the transmission to shift down the gearshift level by one step, and when a second manipulation signal is input from the second control information input device 122b, the controller 160 may control the transmission to shift up the gearshift level by one step.

It is also possible that when the signal input through the mode input device 121 corresponds to the third mode, the controller 160 may recognize the driving mode as the third mode and switch the function of the control information input device 122 to the function to control the gearshift level.

When the signal input through the mode input device 121 corresponds to the first mode, the controller 160 recognizes the driving mode as the first mode and switches the function of the control information input device 122 to a function to control the amount of regenerative braking.

Specifically, the controller 160 may switch the function of the first control information input device 122a to a function to increase the amount of regenerative braking, and switch the function of the second control information input device 122b to a function to reduce the amount of regenerative braking.

More specifically, while the driving mode is the first mode and a signal of a driving mode is received at the lever signal receiver, the controller 160 may control operation of at least one of the transmission and the motor to increase the amount of regenerative braking by a certain amount when the first manipulation signal is input from the first control information input device 122a, and control operation of at least one of the transmission and the motor to reduce the amount of regenerative braking by a certain amount when the second manipulation signal is input from the second control information input device 122b.

Furthermore, it is also possible for the controller 160 to control the braking torque of the motor when the first manipulation signal is received from the first control information input device 122a and reduce the gearshift level of the transmission when a target amount of regenerative braking is equal to a preset amount of regenerative braking. For example, when the target amount of regenerative braking is a second amount of regenerative braking or a fourth amount of regenerative braking, the controller 160 may control the transmission to shift the gear down by one step. Reducing the gearshift level of the transmission may increase the torque of the motor.

It is also possible for the controller 160 to control the transmission 148 to reduce the gearshift level of the transmission after the regenerative braking operation elapses a preset period of time. In this case, the gears of the transmission may be shifted down by one step or two or more steps.

Controlling the amount of regenerative braking in response to manipulations of the control information input device 122 will now be described in connection with FIG. 4.

As shown in FIG. 4, when the accelerator pedal 117 is released from application of pressure, the controller 160 sets the target amount of regenerative braking to a reference amount of regenerative braking and controls the motor to produce the target amount of regenerative braking corresponding to the reference amount of regenerative braking.

The controller 160 may control the regenerative torque of the motor by controlling a current applied to the motor to flow in the reverse direction in order to reach the reference amount of regenerative braking, in which case if a manipulation signal is received once (A1) from the first control information input device 122*a*, the controller 160 may set the target amount of regenerative braking to a first amount of regenerative braking increased by a first amount from the reference amount of regenerative braking and control the regenerative torque of the motor to reach the set first amount of regenerative braking, if a manipulation signal is received once more (A2) from the first control information input device 122*a*, the controller 160 may set the target amount of regenerative braking to a second amount of regenerative braking increased by the first amount from the first amount of regenerative braking and control the regenerative torque of the motor to reach the set second amount of regenerative braking, and if a manipulation signal is received once more (A3) from the first control information input device 122*a*, the controller 160 may set the target amount of regenerative braking to a third amount of regenerative braking increased by the first amount from the second amount of regenerative braking and control the regenerative torque of the motor to reach the set third amount of regenerative braking.

Setting the target amount of regenerative braking to the second amount of regenerative braking increased by the first amount from the first amount of regenerative braking may correspond to setting the target amount of regenerative braking to the second amount of regenerative braking increased by a second amount from the reference amount of regenerative braking.

Setting the target amount of regenerative braking to the third amount of regenerative braking increased by the first amount from the second amount of regenerative braking may correspond to setting the target amount of regenerative braking to the third amount of regenerative braking increased by a third amount from the reference amount of regenerative braking.

During the regenerative braking with the third amount of regenerative braking, if a manipulation signal is received once (A4) from the second control information input device 122*b*, the controller 160 may set the target amount of regenerative braking to the second amount of regenerative braking reduced by a first amount from the third amount of regenerative braking and control the regenerative torque of the motor to reach the set second amount of regenerative braking, if a manipulation signal is received once more (A5) from the second control information input device 122*b*, the controller 160 may set the target amount of regenerative braking to the first amount of regenerative braking reduced by the first amount from the second amount of regenerative braking and control the regenerative torque of the motor to reach the set first amount of regenerative braking, and if a manipulation signal is received once more (A6) from the second control information input device 122*b*, the controller 160 may set the target amount of regenerative braking to the reference amount of regenerative braking reduced by the first amount from the first amount of regenerative braking and control the regenerative torque of the motor to reach the set reference amount of regenerative braking.

Setting the target amount of regenerative braking to the first amount of regenerative braking reduced by the first amount from the second amount of regenerative braking may correspond to setting the target amount of regenerative braking to the first amount of regenerative braking reduced by the second amount from the third amount of regenerative braking.

If the manipulation signal is consecutively received from the first control information input device 122*a* for more than a certain period of time, the controller 160 may gradually increase the amount of regenerative braking by a certain unit of amount, and otherwise if the manipulation signal is not received from the first control information input device 122*a*, the controller 160 may determine an amount of regenerative braking having increased for the last time and control at least one of the transmission and the motor based on the determined amount of regenerative braking.

In this regard, receiving the manipulation signal from the first control information input device 122*a* consecutively for the certain period of time is referred to as receiving a holding signal of the first control information input device 122*a*. Assuming that the certain period of time is 1 second, if the manipulation signal is received consecutively from the first control information input device 122*a* for 1 second or more, the controller 160 may increase the target amount of regenerative braking by the first amount from the currently set amount of regenerative braking, if the manipulation signal is received consecutively for 2 seconds or more, the controller 160 may increase the target amount of regenerative braking by the second amount from the currently set amount of regenerative braking, and if the manipulation signal is received consecutively for 3 seconds or more, the controller 160 may increase the target amount of regenerative braking by the third level from the currently set amount of regenerative braking.

The second amount may be twice the first amount, and the third amount may be three times the first amount.

The second amount may be greater than the first amount, and the third amount may be greater than the second amount.

If the manipulation signal is consecutively received from the second control information input device 122*b* for more than a certain period of time, the controller 160 may gradually reduce the target amount of regenerative braking by a certain unit of amount, and otherwise if the manipulation signal is not received from the second control information input device 122*b*, the controller 160 may determine an amount of regenerative braking having decreased for the last time and control at least one of the transmission and the motor based on the determined amount of regenerative braking.

For example, assuming that the certain period of time is 1 second, if the manipulation signal is received consecutively from the second control information input device 122*b* for 1 second or more, the controller 160 may reduce the target amount of regenerative braking by the first amount from the currently set amount of regenerative braking of the motor, if the manipulation signal is received consecutively for 2 seconds or more, the controller 160 may reduce the target amount of regenerative braking by the second amount from the currently set amount of regenerative braking, and if the manipulation signal is received consecutively for 3 seconds or more, the controller 160 may reduce the target amount of regenerative braking by the third level from the currently set amount of regenerative braking.

The controller 160 may increase the amount of regenerative braking based on a period of time for which the manipulation signal is received from the first control information input device 122*a*, and decrease the amount of regenerative braking based on a period of time for which the manipulation signal is received from the second control information input device 122*b*. In other words, the controller 160 may control the amount of regenerative braking by a preset amount of regenerative braking in proportion to a period of time for which the control information input device 122 is manipulated.

The controller 160 may increase the amount of regenerative braking to a maximum amount of regenerative braking set in advance based on the holding signal of the first control information input device 122*a*, and reduce the amount of regenerative braking to a basic amount of regenerative braking set in advance based on the holding signal of the second control information input device 122*b*.

To control the amount of regenerative braking, the controller 160 may control the torque of the motor or the gearshift level of the transmission.

For example, the controller 160 may increase the torque of the motor to increase the amount of regenerative braking, thereby increasing the deceleration, and reduce the torque of the motor to reduce the amount of regenerative braking, thereby reducing the deceleration.

The controller 160 may reduce the gearshift level of the transmission to increase the torque of the motor to increase the amount of regenerative braking, and increase the gearshift level of the transmission to reduce the torque of the motor to reduce the amount of regenerative braking.

If the manipulation signal is consecutively received from the first control information input device 122*a* for more than a certain period of time in a state of having the highest increase in amount of regenerative braking, the controller 160 may control operation of the EPB.

If the manipulation signal is consecutively received from the first control information input device 122*a* for more than a certain period of time in a state of having the highest increase in amount of regenerative braking and it is determined that the vehicle is stopped, the controller 160 may control an auto holding function.

The auto holding function is a function to hold the vehicle wheels to prevent sudden moving of the vehicle by maintaining the braking force even when the pressure on the brake pedal is released when the vehicle is temporarily stopped e.g., to wait for traffic signal with the transmission lever positioned in the drive level D. The auto holding function is released when the accelerator pedal is pushed, and applies the braking force to the vehicle wheels to prevent the vehicle from slipping on a road with more than a certain gradient.

While the driving mode is the first mode, when the first manipulation signal is received from the first control information input device, the controller 160 may control operation of the transmission based on a preset gearshift pattern to increase deceleration to increase the amount of regenerative braking, and when the second manipulation signal is received from the second control information input device, the controller 160 may control operation of the transmission based on a preset gearshift pattern to reduce deceleration to reduce the amount of regenerative braking.

While the driving mode is the first mode, when the first manipulation signal is received from the first control information input device, the controller 160 may control operation of the transmission based on a period of time for which the first manipulation signal is received to gradually increase deceleration to gradually increase the amount of regenerative braking, and when the second manipulation signal is received from the second control information input device, the controller 160 may control operation of the transmission based on a period of time for which the second manipulation signal is received to gradually reduce deceleration to gradually reduce the amount of regenerative braking.

When gradually changing the amount of regenerative braking based on a period of time for which the first or second manipulation signal is received, the controller 160 may change the preset gearshift pattern based on the reception period, and control operation of the transmission based on the changed gearshift pattern to change the deceleration.

The controller 160 may control the amount of regenerative braking when the manipulation signal is received from the control information input device 122 that performs controlling the amount of regenerative braking, and obtains required braking power of the driver based on the speed and frequency at which the brake pedal is pushed from information about pressure on the brake pedal 116 when the pressure information is received while controlling the amount of regenerative braking and control operation of the hydraulic brake system based on the obtained required amount of braking power.

When receiving the up-shift signal or down-shift signal from the lever signal receiver 155, the controller 160 may control operation of the transmission 148 based on the up-shift signal or down-shift signal.

If the vehicle is equipped with the function switching input device 123, the controller 160 may determine whether the function switching input device 123 is turned on based on function switching information input to the function switching input device 123, if it is determined that the function switching input device 123 is on, switch the function of the control information input device to the function to control regenerative braking and switch the function to manipulate the transmission lever 113 to be shifted to the up/down-shift level 113*a*/113*b* to the function to control regenerative braking, and If it is determined that the function switching input device 123 is off, switch the function of the control information input device 122 to a function to control the gearshift level and switch the function to manipulate the transmission lever 113 to be shifted to the up/down-shift level 113*a*/113*b* to the function to control the gearshift level.

In this regard, while the function switching input device 123 is on, when receiving the down-shift signal from the lever signal receiver 155, the controller 160 may switch the function of the control information input device 122 to a function to increase the amount of regenerative braking, and when receiving the up-shift signal from the lever signal receiver 155, the controller 160 may switch the function of the control information input device 122 to a function to reduce the amount of regenerative braking.

When receiving a function switching release signal during the first mode, the controller 160 may switch the function of the control information input device 122 to the function to control the gearshift level.

When receiving the function switching release signal while the function switching input device is on, the controller 160 may switch the function of the control information input device 122 to the function to control the gearshift level, and switch the function to manipulate the transmission lever 113 to the up/down-shift level 113*a*/113*b* to the function to control the gearshift level.

The function switching release signal may include a signal generated when the transmission lever is positioned in the neutral level; a signal generated when the driving mode is changed to the second mode, which is the sports mode; a signal generated when a SoC of the battery is higher than an allowed state; a signal generated when the battery temperature is higher than a first threshold temperature; a signal generated when the battery temperature is lower than a second threshold temperature; a signal generated when the clutch temperature is higher than a third threshold temperature.

The first threshold temperature is a temperature when the battery has high temperature; the second threshold temperature is a temperature when the battery has extremely low temperature; the third threshold temperature is a temperature when the clutch is overheated.

The controller 160 may limit increase in amount of regenerative braking based on the SoC of the battery. Specifically, the controller 160 may change the maximum amount of regenerative braking corresponding to manipulation of the control information input device based on the SoC of the battery. The higher the SoC of the battery, the lower the maximum amount of regenerative braking.

For example, if the SoC of the battery is about 80% or more, the maximum amount of regenerative braking may be set to a first amount of regenerative braking, and if the SoC of the battery is in a range of about 60 to about 80%, the maximum amount of regenerative braking may be set to a second amount of regenerative braking.

The controller 160 may be implemented with a memory (not shown) storing an algorithm to control operation of the components in the vehicle 100 or data about a program that implements the algorithm, and a processor (not shown) carrying out the aforementioned operation using the data stored in the memory. The memory and the processor may be implemented in separate semiconductor configurations. Alternatively, the memory and the processor may be implemented in a semiconductor configuration.

The controllers 160 may be an electronic control unit (ECU) for controlling driving of the vehicle, or one of a micro controller, a central processing unit (CPU), or a processor.

The controller 160 may include a first controller, an Engine Control Unit (ECU), for controlling operation of the generator 145 and the engine 142, a second controller, an Motor Control Unit, for controlling the inverter 146 based on a control signal from a main controller to rotate the motor 144 and perform regenerative braking at the time of braking or slowdown of the vehicle 100, a third controller, a Local Control Unit, for controlling operation of the actuator 147a to open or close the clutch 147, and the main controller, an HEV Control Unit (HCU), for distributing torque to the engine 142 and the motor 144 based on the target driving speed for the vehicle 100 and outputting control signals to the first, second, and third controllers based on the distributed torque.

The first, second, third, and the main controllers may be implemented separately or packaged in an integrated single chip.

The storage 161 may store amounts of regenerative braking that match a plurality of increases of deceleration and amounts of regenerative braking that match a plurality of decreases of deceleration in a look-up table. The contents in the look-up table may be experimentally obtained and stored in advance.

In relation to correlation between the deceleration and the amount of regenerative braking stored in the look-up table, the larger the deceleration, the more the amount of regenerative braking increases, and the smaller the deceleration, the more the amount of regenerative braking is reduced.

In other words, the vehicle may increase the amount of regenerative braking by increasing the deceleration, and with the increase in amount of regenerative braking, the SoC of the battery may increase as well.

The storage 161 may store a gearshift pattern to change the amount of regenerative braking.

The storage 161 may also store information about a change of the gearshift pattern to gradually change the amount of regenerative braking. The information about a change of the gearshift pattern may be information to gradually change the deceleration.

The storage 161 may be a memory implemented with a chip separate from a processor in relation to the controller 160, or may be implemented with the processor in a single chip.

The storage 161 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto.

Several battery cells are connected in series/parallel in a battery pack of the battery to have as much voltage and current capacity as required. The battery manager 170 may estimate an SoC of each battery cell in the battery pack while monitoring the state of the battery cell, and keep the cell voltage constant to prevent overcharging/overdischarging while managing charging/discharging of the battery cell.

Since the battery has a relation between the SoC and the voltage which is changed according to the temperature and discharge current of the battery and non-linear, the battery manger 170 may use Coulomb counting for measuring an amount of charged or discharged current from the battery and a method for checking a drift point in a voltage-SoC characteristic curve of the battery, at which to determine the SoC from the cell voltage.

In other words, the battery manager 170 may detect a current, a voltage, and temperature of the battery 143, determine an SoC of the battery 143 based on the detected current, voltage, and temperature, and manage the battery 143 to be charged or discharged based on the SoC of the battery 143.

The battery manger 170 may include a current detector for detecting the current of the battery, and optionally include a voltage detector for detecting the voltage of the battery and a temperature detector for detecting temperature of the battery.

The battery manager 170 may monitor the SoC of the battery based on the detected current of the battery.

It is also possible for the battery manger 170 to monitor the SoC of the battery based on the detected current and voltage of the battery.

Alternatively, the battery manger 170 may monitor the SoC of the battery based on the current, voltage, and temperature of each cell of the battery.

The battery manager 170 may output information about the monitored SoC of the battery to the controller 160.

The SoC of the battery 143 may include an amount of charge of the battery 143.

The battery manager 170 may send information about the temperature of the battery to the controller 160.

The one or more actuators 180 may include the first actuator 181 for driving the motor at rotation speed corresponding to a control instruction from the controller 160; a second actuator 182 for driving the engine at rotation speed corresponding to a control instruction from the controller 160; a third actuator 183 for controlling the gearshift level of the transmission to a level corresponding to a control instruction from the controller 160; and a fourth actuator 184 for operating the EPB to correspond to a control instruction from the controller 160.

The first actuator 181 may correspond to an inverter comprised of a plurality of switches.

The engine 142 may be turned on or off based on a control instruction from the controller 160, and while the engine 142 is turned on, the rpm may be controlled according to a control instruction from the controller 160.

When the clutch 137 is closed, the engine 142 transmits the generated power to the vehicle wheels 141 and the generator 145.

The battery 143 may be charged by the motor that acts as a generator during regenerative braking of the motor 144.

The inverter 146 may convert direct current (DC) power supplied from the battery 143 to 3-phase alternate current (AC) power based on a control instruction from the controller 160, and applies the AC power to the motor 144.

The motor 144 is rotated while controlling the rpm based on a control instruction from the controller 160 and transmits the turning force to the vehicle wheels.

At the time of deceleration and braking, power applied to the motor 144 is cut off and a reverse direction of current is applied, causing production of the reverse direction of torque. At this time, the motor 144 is rotated in the same direction as the direction before the time of braking due to the inertial force.

Figure 5A:
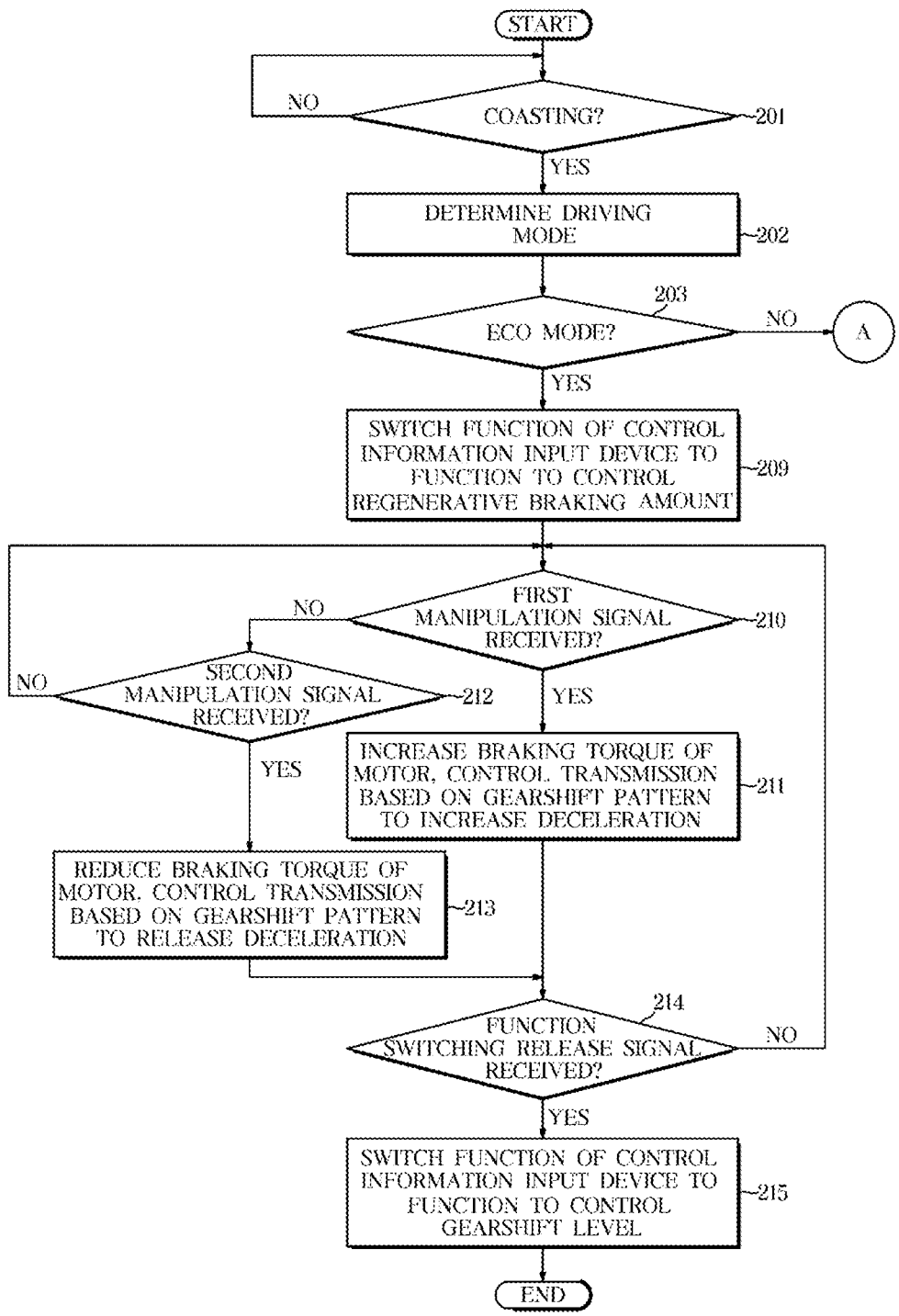
FIGS. 5A and 5B are flowcharts of controlling a vehicle not equipped with a function switching input device, according to an embodiment of the present disclosure.
Figure 5B:
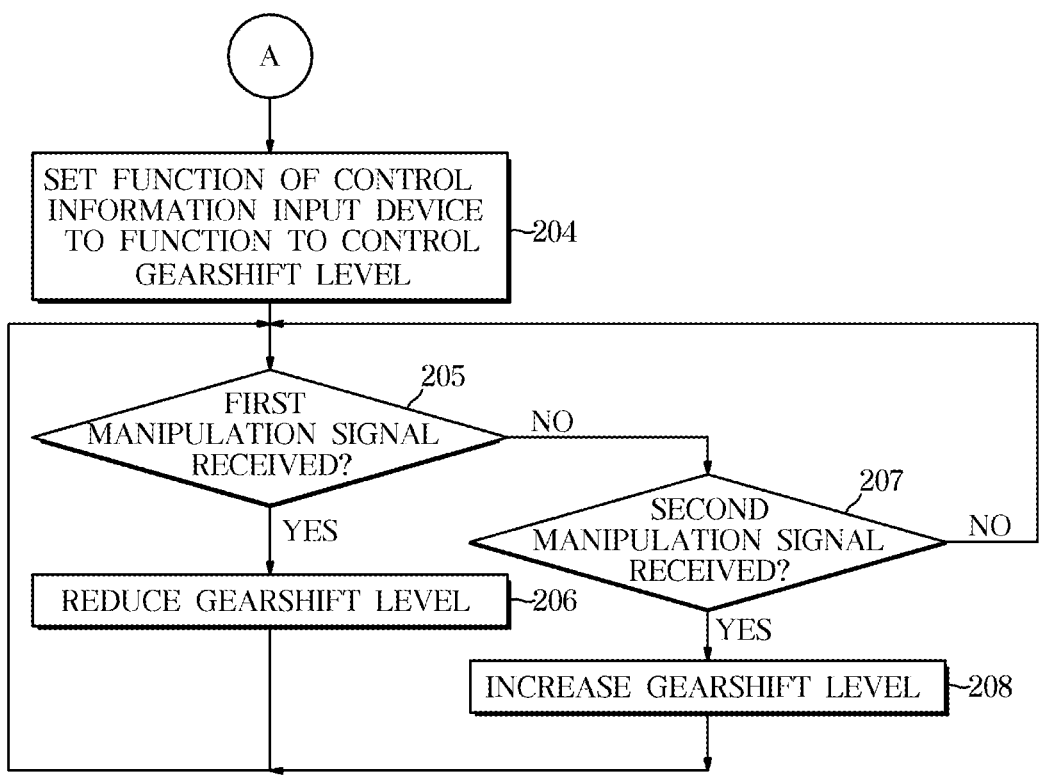

FIGS. 5A and 5B are flowcharts illustrating a control method of a vehicle, which will be described in connection with FIGS. 6 to 10.

First, a method for controlling a vehicle that is not equipped with the function switching input device will be described.

It is determined whether the vehicle is coasting in 201, and if it is determined that the vehicle is coasting, the vehicle performs regenerative braking and checks a driving mode in 202.

Determining whether the vehicle is coasting includes determining based on information detected by the detector 150 whether the vehicle is in the state of driving, whether the accelerator pedal 117 is not pushed, and whether the brake pedal 116 is not pushed.

Determining whether the vehicle is in the state of driving may include determining whether the driving speed of the vehicle is not zero.

Determining whether the accelerator pedal 117 is not pushed may include determining whether a pressure signal is not generated from the accelerator pedal 117.

Determining whether the brake pedal 116 is not pushed may include determining whether a pressure signal is not generated from the brake pedal 116.

While performing regenerative braking, the vehicle may set the target amount of regenerative braking to a reference amount of regenerative braking, control the braking operation to reach the reference amount of regenerative braking, and operate the motor as a generator.

Operating the motor as a generator may include controlling the switches of the inverter to be operated in the same operating mechanism as a boost converter by the counter electromotive force.

Controlling the braking operation may include setting a torque value of the motor to a negative value that corresponds to the reference amount of regenerative braking, so that the current flows to the battery in the opposite direction to a direction of the current flowing in the acceleration. Since the current flows in the reverse direction, the torque is produced in the reverse direction, enabling regenerative braking.

In other words, the vehicle may cut off the power applied to the motor 144 and control the current applied to the motor 144 to flow in the reverse direction, enabling the motor 144 to operate as a generator to charge the battery. The rotation direction of the motor 144 is not changed due to the inertial force.

As such, the vehicle may enable the motor 144 to operate as a generator and thus charge the battery.

Furthermore, the vehicle may determine an amount of charge of the battery based on the SoC of the battery, and if the amount of charge of the battery is more than an allowed amount, perform no operation related to battery charging but perform deceleration or braking.

The vehicle may determine whether the driving mode is the first mode, which is the eco mode, in 203, and if it is not determined to be the eco mode, set the function of the control information input device 122 to a function to control the gearshift level, in 204.

Determining that the driving mode is not the eco mode may include determining that the eco mode is not selected by the mode input device equipped in the vehicle. Specifically, determining that the driving mode is not the eco mode may include determining that a signal corresponding to the sports mode or the normal mode is received from the mode input device of the vehicle.

Setting the function of the control information input device 122 to the function to control the gearshift level may include setting the function of the first control information input device 122a to the function to reduce the gearshift level, and setting the function of the second control information input device 122b to the function to increase the gearshift level.

Furthermore, the control information input device 122 may be set by default to the function to control the gearshift level, and may switch the function when the eco mode is selected.

While coasting in the normal mode or sports mode, when the user manipulates once, e.g., toggle, the first control information input device 122a within a certain period of time and thus the first manipulation signal is received from the first control information input device 122a in 205, the vehicle may set the transmission to have a gearshift level one-step lower than the current gearshift level in 206, and operate the transmission to be controlled at the set gearshift level.

While coasting in the normal mode or sports mode, when the user manipulates once more, e.g., toggle, the first control information input device 122a and thus the first manipulation signal is received from the first control information input device 122a, the vehicle may set the transmission to have a gearshift level one-step lower than the previously controlled gearshift level, and operate the transmission to be controlled at the set gearshift level.

While coasting in the normal mode or sports mode, when the user manipulates once, e.g., toggle, the second control information input device 122b and thus the second manipulation signal is received from the second control information input device 122b in 207, the vehicle may set the transmission to have a gearshift level one-step higher than the current gearshift level in 208, and operate the transmission to be controlled at the set gearshift level.

While coasting in the normal mode or sports mode, when the user manipulates once more, e.g., toggle, the second control information input device 122*b* and thus the second manipulation signal is received from the second control information input device 122*b*, the vehicle may set the transmission to have a gearshift level one-step higher than the previously controlled gearshift level, and operate the transmission to be controlled at the set gearshift level.

While coasting in the normal mode or sports mode, when the user manipulates the transmission level 113 to be moved to the down-shift level (−) and thus the lever signal receiver 155 receives the first manipulation signal, the vehicle may set the transmission to have a gearshift level one-step lower than the current gearshift level, and operate the transmission to be controlled at the set gearshift level.

While coasting in the normal mode or sports mode, when the user manipulates the transmission level 113 to be moved to the up-shift level (+) and thus the lever signal receiver 155 receives the second manipulation signal, the vehicle may set the transmission to have a gearshift level one-step higher than the current gearshift level, and operate the transmission to be controlled at the set gearshift level.

When the vehicle determines that the driving mode is the first mode, which is the eco mode, the vehicle sets the function of the control information input device 122 to the function to control an amount of regenerative braking, in 209.

Determining that the driving mode is the eco mode may include determining that a signal corresponding to the eco mode has been received from the mode input device equipped in the vehicle.

Setting the function of the control information input device 122 to the function to control the amount of regenerative braking may include setting the function of the first control information input device 122*a* to the function to increase the amount of regenerative braking, and setting the function of the second control information input device 122*b* to the function to reduce the amount of regenerative braking.

As such, switching the function of the control information input device 122, e.g., paddle, may increase usability of the control information input device 122, e.g., paddle.

While coasting in the eco mode, when the user manipulates once, i.e., toggle, the first control information input device 122*a* and thus the first manipulation signal is received from the first control information input device 122*a* in 210, the vehicle sets the target amount of regenerative braking to the first amount of regenerative braking by increasing the reference amount of regenerative braking by a first amount and increases the braking torque of the motor in 211 for the amount of regenerative braking of the vehicle to reach the set first amount of regenerative braking, thereby increasing the deceleration to a certain extent.

Furthermore, the vehicle increases the deceleration by controlling operation of the transmission based on a preset gearshift pattern, in 211.

While coasting in the eco mode, when the user manipulates once more, i.e., toggle, the first control information input device 122*a* and thus the first manipulation signal is received one more time from the first control information input device 122*a*, the vehicle sets the target amount of regenerative braking to the second amount of regenerative braking by increasing the first amount of regenerative braking by the first amount and increases the braking torque of the motor for the amount of regenerative braking of the vehicle to reach the set second amount of regenerative braking, thereby further increasing the deceleration to the certain extent.

As such, increasing braking torque to increase the deceleration to a certain extent may lead to an increase in the amount of regenerative braking of the vehicle and thus, to an increase in amount of charge of the battery. This will be described with reference to FIGS. 6 and 7.

Figure 6:
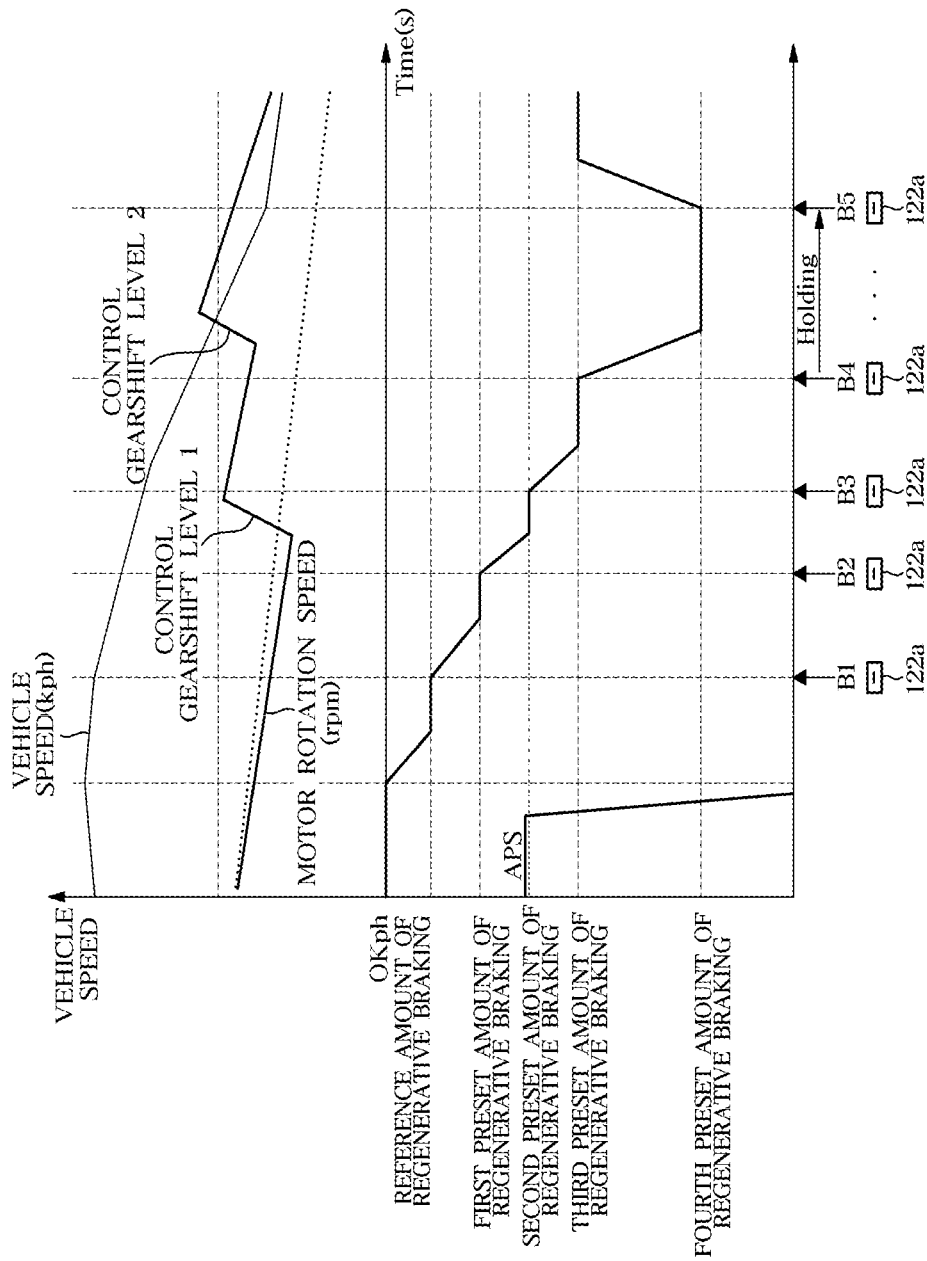
FIGS. 6 and 7 show the amount of regenerative braking controlled in response to manipulations of a first control information input device of a vehicle, according to an embodiment of the present disclosure.

As shown in FIG. 6, if no accelerator pedal signal (APS) is received, the vehicle gradually reduces the driving speed of the vehicle by reducing the rotation speed of the motor.

In this regard, the vehicle may reduce the rotation speed of the motor by setting the torque value of the motor to a negative value to run the current in the reverse direction.

The vehicle sets the target amount of regenerative braking to the reference amount of regenerative braking, and controls the braking torque of the motor for the regenerative braking power of the vehicle to reach the reference regenerative braking power.

When the first control information input device 122*a* is toggled once more and thus the first manipulation signal is received (B1) from the first control information input device 122*a* during regenerative braking, the vehicle sets the target amount of regenerative braking to the first amount of regenerative braking by increasing the reference amount of regenerative braking by a first amount and increases the braking torque of the motor for the amount of regenerative braking of the vehicle to reach the set first amount of regenerative braking, thereby further increasing the deceleration to a certain extent.

When the first control information input device 122*a* is toggled once more and thus the first manipulation signal is received (B2) from the first control information input device 122*a* during regenerative braking, the vehicle sets the target amount of regenerative braking to the second amount of regenerative braking by increasing the first amount of regenerative braking by the first amount and increases the braking torque of the motor for the amount of regenerative braking of the vehicle to reach the set second amount of regenerative braking, thereby further increasing the deceleration to a certain extent.

When determining that the target amount of regenerative braking reaches the second amount of regenerative braking, the vehicle may shift down the gearshift level of the transmission by one step.

Furthermore, when controlling the amount of regenerative braking by manipulation of the first control information input device 122*a*, the vehicle may shift down the gearshift level of the transmission by one step if it is determined that a preset first period of time has elapsed from the start of controlling the amount of regenerative braking.

When the first control information input device 122*a* is toggled once more and thus the first manipulation signal is received (B3) from the first control information input device 122*a* during regenerative braking, the vehicle sets the target amount of regenerative braking to the third amount of regenerative braking by increasing the second amount of regenerative braking by the first amount and increases the braking torque of the motor for the amount of regenerative braking of the vehicle to reach the set third amount of regenerative braking, thereby further increasing the deceleration to a certain extent.

When the first manipulation signal generated by manipulating and holding the first control information input device 122*a* for a certain period of time is received (B4) during the regenerative braking, the vehicle gradually increases the amount of regenerative braking from the current amount of regenerative braking. When the increasing amount of regenerative braking reaches the maximum amount of regenerative braking, i.e., the fourth amount of regenerative braking, increasing the amount of regenerative braking is stopped and the maximum amount of regenerative braking is fixed.

When determining that the target amount of regenerative braking is the fourth amount of regenerative braking, the vehicle may shift down the gearshift level of the transmission by one step.

Furthermore, when controlling the amount of regenerative braking by manipulation of the first control information input device 122a, the vehicle may shift down the gearshift level of the transmission by one step if it is determined that a preset second period of time has elapsed from the start of controlling the amount of regenerative braking.

The vehicle may shift down the gearshift level of the transmission by one step whenever the first control information input device is manipulated.

When manipulation B5 of the first control information input device 122a is released and no manipulation signal is received from the first control information input device 122a, the vehicle determines that holding of the first control information input device is released, and remains at the current amount of regenerative braking unless the current amount of regenerative braking is not the maximum amount of regenerative braking.

If the current amount of regenerative braking is the maximum amount of regenerative braking when the vehicle determines that the holding is released, the vehicle reduces the braking torque of the motor to reduce the amount of regenerative braking to an amount one-step less than the maximum amount of regenerative braking, i.e., to the third amount of regenerative braking, thereby reducing the deceleration.

Figure 7:
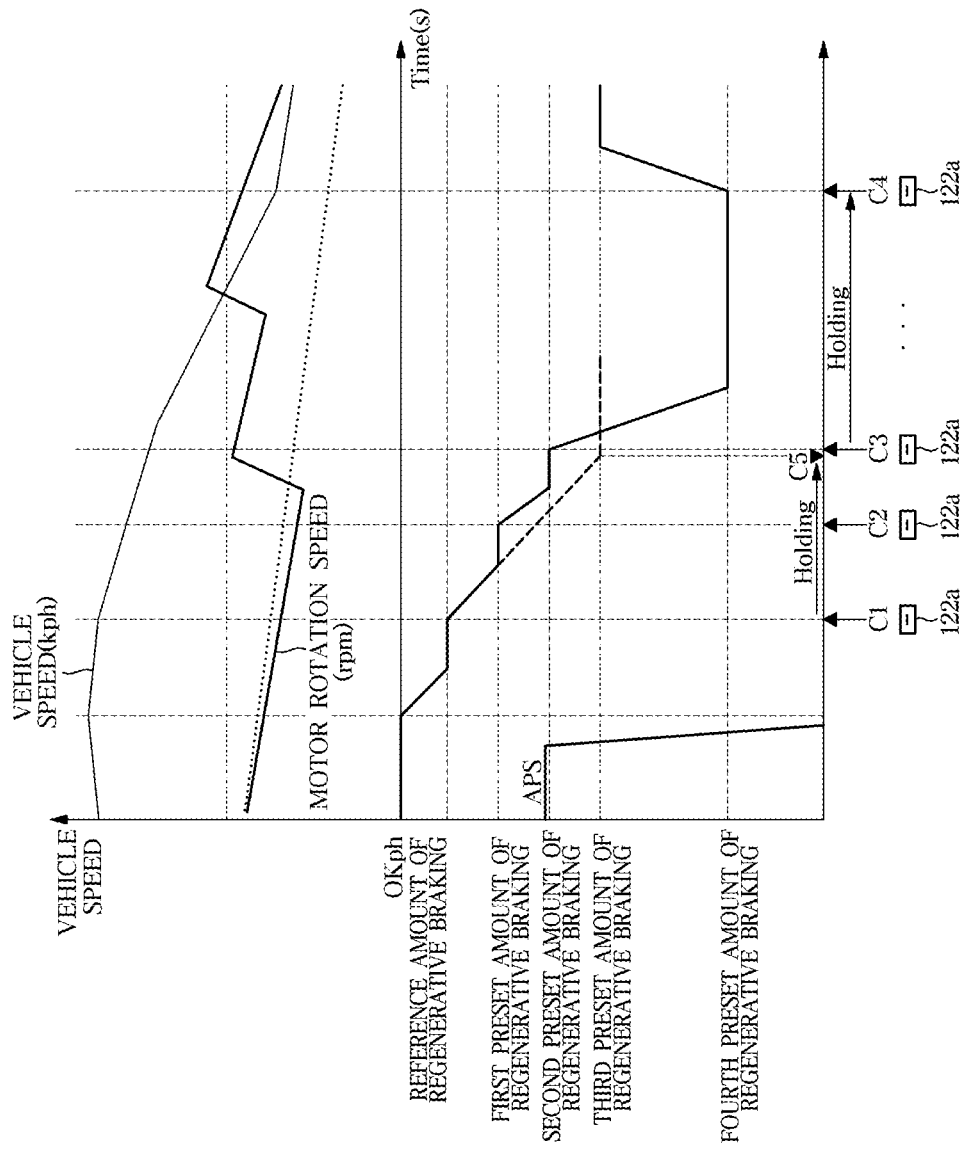

Referring to FIG. 7, at a point in time where the target amount of regenerative braking is the second amount of regenerative braking, when the first manipulation signal is consecutively received (C3), the vehicle determines that the holding occurs and thus gradually increases the amount of regenerative braking; when there is no first manipulation signal received (C4), the vehicle determines that the holding is released during the increase of the amount of regenerative braking and determines an amount of regenerative braking at the time of releasing the holding; and if the determined amount of regenerative braking is the maximum amount of regenerative braking, the vehicle reduces the braking torque of the motor to reduce the amount of regenerative braking to an amount one-step less than the maximum amount of regenerative braking, i.e., to the third amount of regenerative braking, thereby reducing the deceleration.

At a point in time where the target amount of regenerative braking is the reference amount of regenerative braking, when the first manipulation signal is consecutively received (C1), the vehicle determines that the holding occurs and thus gradually increases the amount of regenerative braking; when there is no first manipulation signal received (C5), the vehicle determines that the holding is released during the increase of the amount of regenerative braking and determines an amount of regenerative braking at the time of releasing the holding; and when the determined amount of regenerative braking is less than the maximum amount of regenerative braking, i.e., the determined amount of regenerative braking is the third amount of regenerative braking, the vehicle maintains the target amount of regenerative braking to be the current amount of regenerative braking, i.e., the third amount of regenerative braking.

While coasting in the eco mode, when the user manipulates once, i.e., toggle, the second control information input device 122b and thus the second manipulation signal is received from the second control information input device 122b in 212, the vehicle sets the target amount of regenerative braking by increasing the current amount of regenerative braking by a first amount, and reduces the braking torque of the motor in 213 to reach the set target amount of regenerative braking, thereby reducing the deceleration to a certain extent.

Furthermore, the vehicle releases the deceleration, i.e., reduces the deceleration by controlling operation of the transmission based on a preset gearshift pattern, in 213.

While coasting in the eco mode, when the user manipulates once more, i.e., toggle, the second control information input device 122b and thus the second manipulation signal is received one more time from the second control information input device 122b, the vehicle sets the target amount of regenerative braking by increasing the controlled amount of regenerative braking by the first amount and reduces the braking torque of the motor for the amount of regenerative braking of the vehicle to reach the set second amount of regenerative braking, thereby further reducing the deceleration to the certain extent. This will be described with reference to FIG. 8.

Figure 8:
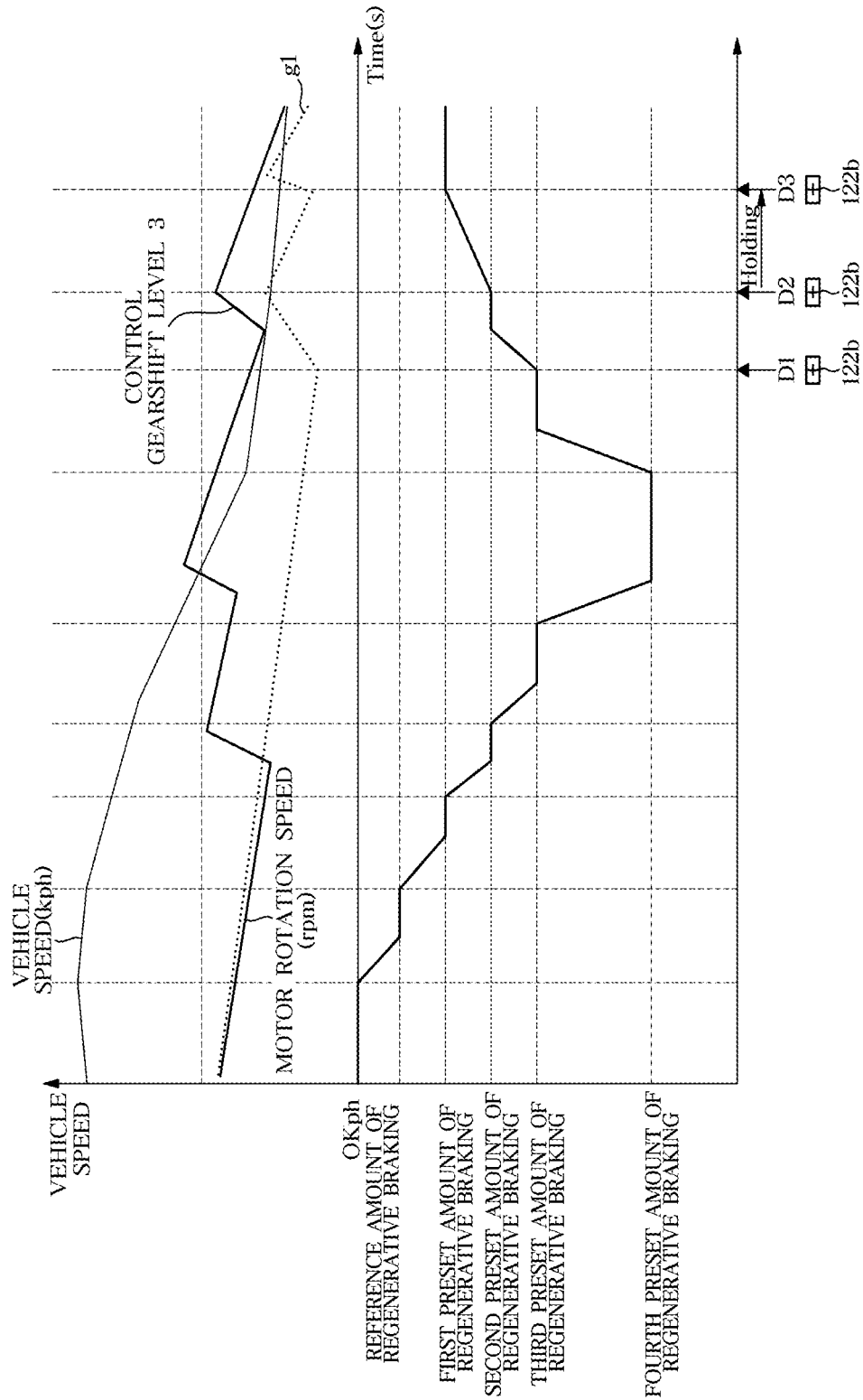
FIGS. 8 and 9 show the amount of regenerative braking controlled in response to manipulations of a second control information input device of a vehicle, according to an embodiment of the present disclosure.

Referring to FIG. 8, when the second control information input device 122b is toggled once more and thus the second manipulation signal is received (D1) from the second control information input device 122b during regenerative braking, the vehicle sets the target amount of regenerative braking to the second amount of regenerative braking by reducing the current amount of regenerative braking, which is the third amount of regenerative braking, by the first amount and reduces the braking torque of the motor for the amount of regenerative braking of the vehicle to reach the set second amount of regenerative braking, thereby reducing the deceleration to a certain extent.

When the second control information input device 122b is manipulated by holding operation during the regenerative braking and the second manipulation signal is consecutively received (D2), the vehicle gradually reduces the current amount of regenerative braking, which is the second amount of regenerative braking, from when the holding operation begins, until when a signal to release the holding operation is received (D3).

If the decreasing amount of regenerative braking reaches a first reference amount of regenerative braking, the vehicle maintains the target amount of regenerative braking at the first reference amount of regenerative braking.

Furthermore, if the decreasing amount of regenerative braking reaches the reference amount of regenerative braking, the vehicle stops reducing the amount of regenerative braking, sets the target amount of regenerative braking to the reference amount of regenerative braking, and reduces the braking torque of the motor for the amount of regenerative braking of the vehicle to reach the set reference amount of regenerative braking, thereby reducing the deceleration.

The vehicle may shift down the gearshift level of the transmission by one step when the vehicle determines that a preset third period of time has elapsed from the start of regenerative braking.

Furthermore, while performing the regenerative braking with the reference amount of regenerative braking without manipulation of the control information input device 122, the vehicle shifts down the gearshift level of the transmission by one step when determining that the preset third period of time has elapsed from the start of regenerative braking (see the graph g1).

In this embodiment, when manipulating the control information input device 122, the vehicle may increase the torque of the motor to increase the deceleration by controlling the gearshift level of the transmission at the beginning of the regenerative braking.

Figure 9:
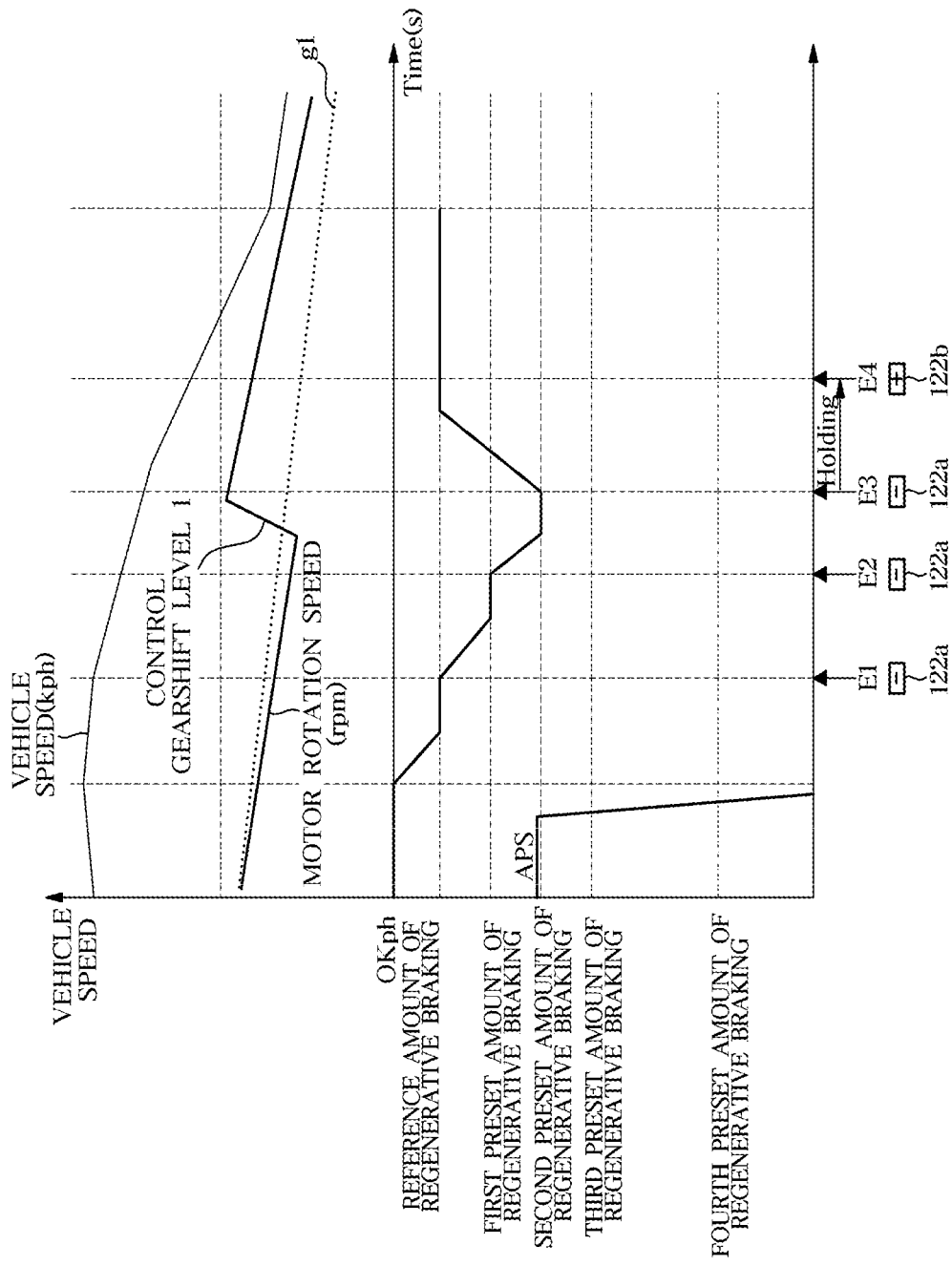

As shown in FIG. 9, the vehicle may gradually reduce the amount of regenerative braking based on a holding operation period for the second control information input device 122b when the second control information input device 122b is manipulated by the holding operation while the target amount of regenerative braking is the second amount of regenerative braking. The vehicle may gradually reduce the amount of regenerative braking until a signal to release the holding of the second control information input device 122b is received (E4), stop reducing the amount of regenerative braking when the decreasing amount of regenerative braking reaches the reference amount of regenerative braking, and remain at the reference amount of regenerative braking.

When the second control information input device 122b is toggled once (E3) while the target amount of regenerative braking is the second amount of regenerative braking, the vehicle sets the target amount of regenerative braking to the first amount of regenerative braking by reducing the second amount of regenerative braking by the first amount and reduces the braking torque of the motor for the amount of regenerative braking of the vehicle to reach the set first amount of regenerative braking, thereby reducing the deceleration to a certain extent. In this case, the vehicle may remain at the gearshift level of the transmission. Subsequently, the vehicle may shift down the gearshift level of the transmission by one step when determining that a preset third period of time has elapsed from the start of regenerative braking.

While coasting in the eco mode, when the user manipulates the transmission level 113 to be moved to the down-shift level (−) and thus the lever signal receiver 155 receives the first manipulation signal, the vehicle may set the transmission to a gearshift level one-step lower than the current gearshift level, and operate the transmission to be controlled at the set gearshift level.

While coasting in the eco mode, when the user manipulates the transmission level 113 to be moved to the up-shift level (+) and thus the lever signal receiver 155 receives the second manipulation signal, the vehicle may set the transmission to have a gearshift level one-step higher than the current gearshift level, and operate the transmission to be controlled at the set gearshift level.

The vehicle may determine whether a function switching release signal is received during the eco mode, and if it is determined that the function switching release signal is received, switch the function of the control information input device 122 to a function to control the gearshift level, in 215.

Determining whether a function switching release signal is received may include determining whether a signal of the neutral mode is received at the lever signal receiver.

Determining whether a function switching release signal is received may include determining whether a signal corresponding to the second mode, which is the sports mode, is received.

Determining whether a function switching release signal is received may include determining whether a signal generated when an amount of charge of the battery is larger than an allowed amount is received. Specifically, determining whether a signal to release function switching is received may further include determining whether at least one of a signal generated when the battery temperature is higher than a first threshold temperature, a signal generated when the battery temperature is lower than a second threshold temperature, and a signal generated when the clutch temperature is higher than a third threshold temperature.

The first threshold temperature is a temperature when the battery has high temperature; the second threshold temperature is a temperature when the battery has extremely low temperature; the third threshold temperature is a temperature when the clutch is overheated.

When determining that the vehicle is stopped during the regenerative braking, the vehicle activates the EPB. This will hereinafter be described with reference to FIG. 10.

Figure 10:
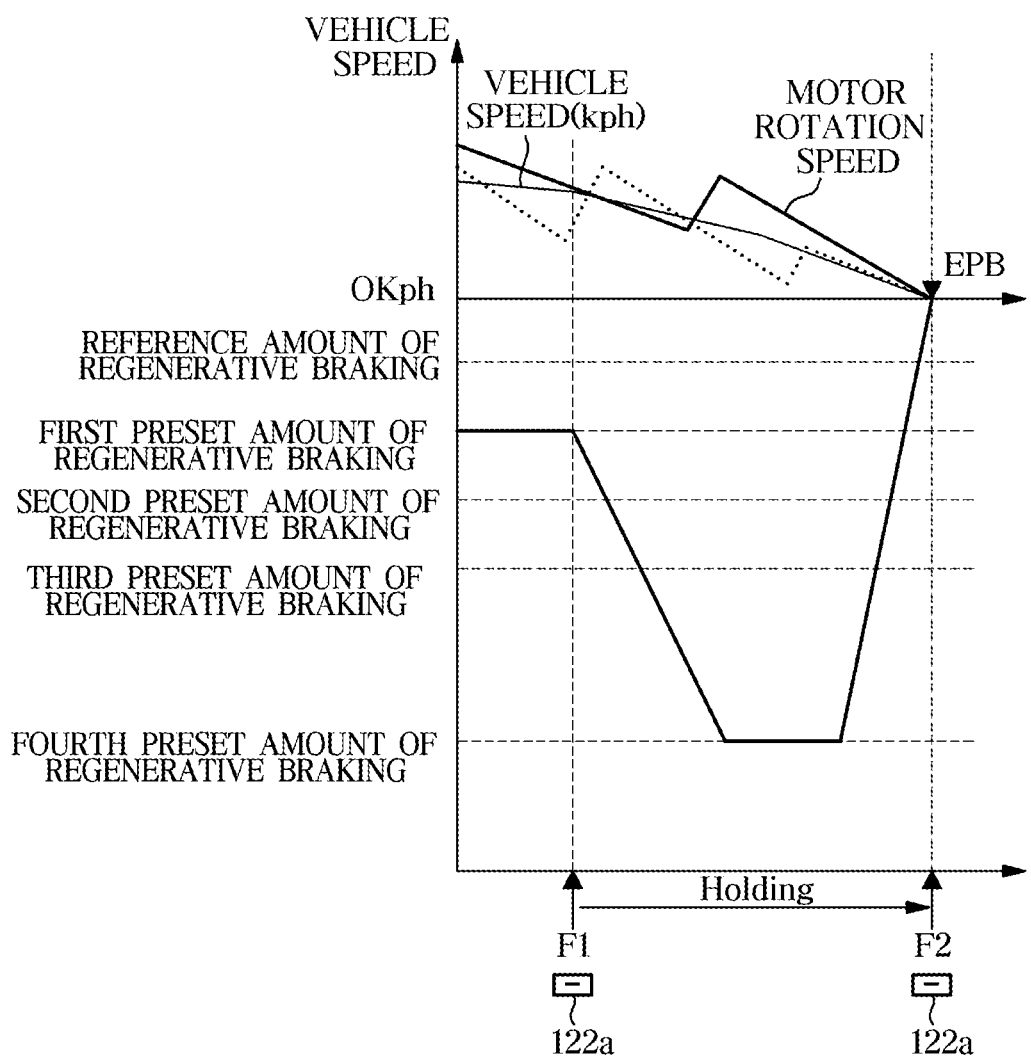
FIG. 10 shows the amount of regenerative braking controlled in response to manipulations of a first control information input device of a vehicle and speed of the vehicle, according to an embodiment of the present disclosure.

Referring to FIG. 10, when the target amount of regenerative braking is the maximum amount of regenerative braking, which is the fourth amount of regenerative braking, the vehicle may maintain the target amount of regenerative braking at the maximum amount of regenerative braking if a holding signal is received (F1) from the first control information input device 122a, activate the EPB if it is determined that the vehicle is stopped while maintaining the target amount of regenerative braking at the maximum amount of regenerative braking, output information about completion of activation of the EPB to guide the user to release the holding operation of the first control information input device 122a if it is determined that the activation of the EPB is finished.

The vehicle may receive (F2) a signal to release the holding operation from the first control information input device 122a after the activation of the EPB is completed.

Figure 11A:
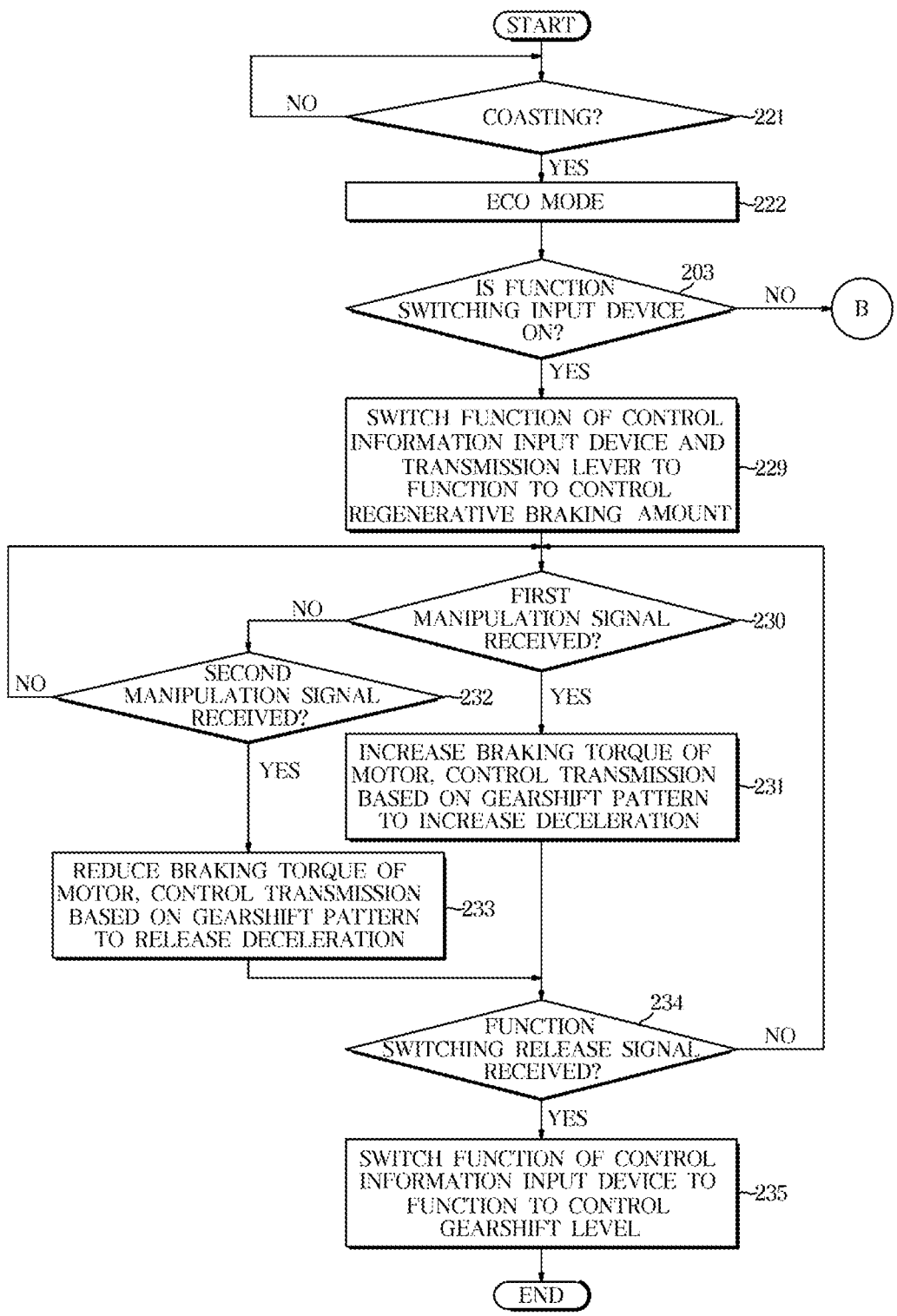
FIGS. 11A and 11B are flowcharts of controlling a vehicle equipped with a function switching input device, according to an embodiment of the present disclosure.
Figure 11B:
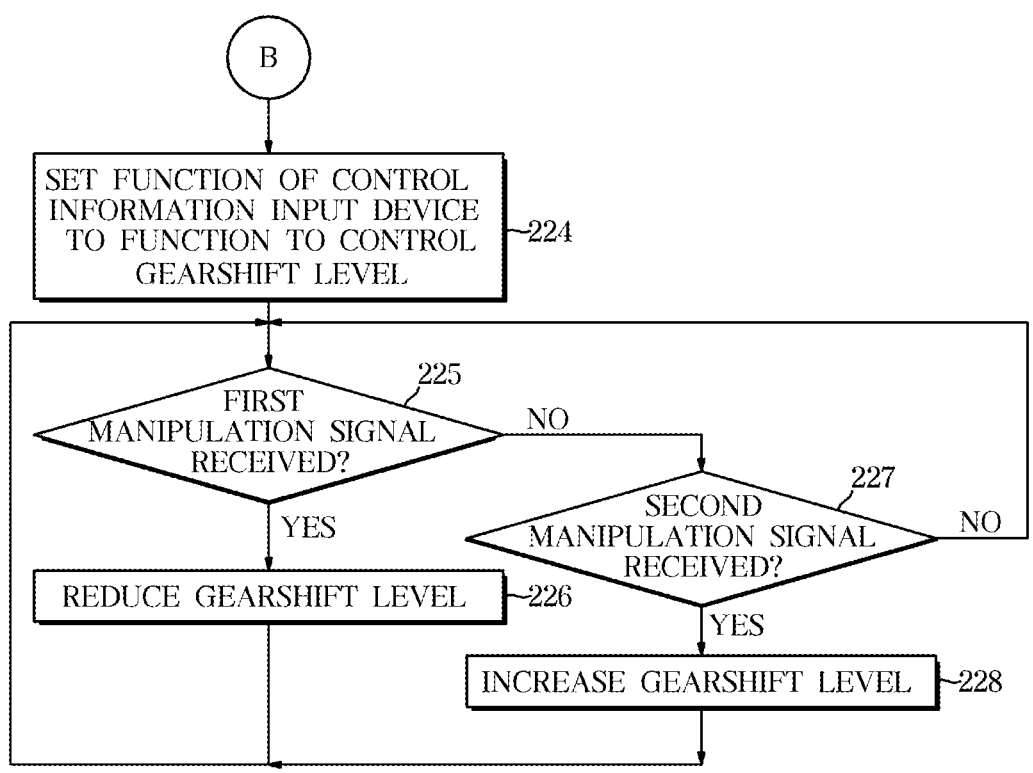

FIGS. 11A and 11B are flowcharts of controlling a vehicle equipped with a function switching input device, according to an embodiment of the present disclosure.

It is determined whether the vehicle is coasting in 221, and if it is determined that the vehicle is coasting, the vehicle performs regenerative braking and determines if the driving mode is the first mode, which is the eco mode in 222.

When the driving mode is the second mode, which is the sports mode, how to control the vehicle in response to manipulations of the control information input device 122 and gearshift manipulations of the transmission lever 113 is the same as the aforementioned method of controlling the vehicle that is not equipped with the function switching input device. Accordingly, a flowchart of controlling the vehicle will focus on an occasion when the driving mode is the eco mode.

In this method, determining whether the vehicle is coasting is the same as what is described above with reference to FIG. 5, so the description will not be repeated. The regenerative braking operation of the vehicle is also the same as what is described above with reference to FIG. 5, so the description will not be repeated.

When determining that the vehicle is coasting in the eco mode, the vehicle determines whether the function switching input device is on, in 223, and if determining that the function switching input device is off, sets the function of the control information input device 122 to the function to manipulate the gearshift level, and sets the function to move the transmission lever 113 to the up- or down-shift level to the function to manipulate the gearshift level.

Setting the function of the control information input device 122 to the function to control the gearshift level may include setting the function of the first control information input device 122a to the function to reduce the gearshift level, and setting the function of the second control information input device 122b to the function to increase the gearshift level.

Setting the function to move the transmission lever 113 to the up- or down-shift level to the function to manipulate the gearshift level may include setting the function to move to the down-shift level (−) of the transmission lever 113 to the function to reduce the gearshift level and setting the function to move to the up-shift level (+) of the transmission lever 113 to the function to increase the gearshift level.

In a state that the function switching input device is off, when receiving the first manipulation signal in 225, the vehicle sets the gearshift level to a level one-step lower than the current gearshift level in 226 and operates the transmission to be controlled at the set gearshift level, and when receiving the second manipulation signal in 227, the vehicle sets the gearshift level to a level one-step higher than the current gearshift level in 228 and operates the transmission to be controlled at the set gearshift level.

The first manipulation signal may include a signal generated when the first control information input device 122a is toggled once, and a down-shift signal of the transmission lever 113.

The second manipulation signal may include a signal generated when the second control information input device 122b is toggled once, and a up-shift signal of the transmission lever 113.

More specifically, in the state that the function switching input device is off, when the user manipulates once, e.g., toggle, the first control information input device 122a and thus the first manipulation signal is received from the first control information input device 122a, the vehicle may set the transmission to have a gearshift level one-step lower than the current gearshift level, and operate the transmission to be controlled at the set gearshift level.

In the state that the function switching input device is off, when the first manipulation signal, i.e., down-shift signal, is received at the lever signal receiver, the vehicle may set the transmission to have a gearshift level one-step lower than the current gearshift level, and operate the transmission to be controlled at the set gearshift level.

In the state that the function switching input device is off, when the user manipulates once, e.g., toggle, the second control information input device 122b and thus the second manipulation signal is received from the second control information input device 122b, the vehicle may set the transmission to have a gearshift level one-step higher than the current gearshift level, and operate the transmission to be controlled at the set gearshift level.

In the state that the function switching input device is off, when the second manipulation signal, i.e., up-shift signal, is received at the lever signal receiver, the vehicle may set the transmission to have a gearshift level one-step higher than the current gearshift level, and operate the transmission to be controlled at the set gearshift level.

When determining that the function switching input device is on, the vehicle sets the function of the control information input device 122 to the function to control the amount of regenerative braking and sets the function to move the transmission lever 113 to the up/down-shift level to the function to control the amount of regenerative braking in 229.

Setting the function of the control information input device 122 to the function to control the amount of regenerative braking may include setting the function of the first control information input device 122a to the function to increase the amount of regenerative braking, and setting the function of the second control information input device 122b to the function to reduce the amount of regenerative braking.

Setting the function to move the transmission lever 113 to the up/down-shift level to the function to control the amount of regenerative braking may include setting the function to move the transmission lever 113 to the down-shift level (−) to the function to increase the amount of regenerative braking and setting the function to move the transmission lever 113 to the up-shift level (+) to the function to reduce the amount of regenerative braking.

When the function switching input device is on and the first manipulation signal is received in 230, the vehicle sets the target amount of regenerative braking to the first amount of regenerative braking by increasing the reference amount of regenerative braking by a first amount and increases the braking torque of the motor for the amount of regenerative braking of the vehicle to reach the set first amount of regenerative braking, thereby further increasing the deceleration to a certain extent.

Furthermore, the vehicle increases the deceleration by controlling operation of the transmission based on a preset gearshift pattern, in 231.

When the function switching input device is on and the second manipulation signal is received in 232, the vehicle may reduce the current amount of regenerative braking by the first amount and reduce the braking torque of the motor to reach the reduced amount of regenerative braking, thereby reducing the deceleration to a certain extent.

Furthermore, the vehicle releases the deceleration, i.e., reduces the deceleration by controlling operation of the transmission based on a preset gearshift pattern, in 233.

The first manipulation signal may include a signal generated when the first control information input device 122a is toggled once, and a down-shift signal of the transmission lever 113.

The second manipulation signal may include a signal generated when the second control information input device 122b is toggled once, and an up-shift signal of the transmission lever 113.

Specifically, when receiving the first manipulation signal from the first control information input device 122a as the first control information input device 122a is manipulated to be toggled once, the vehicle may increase the current amount of regenerative braking by the first amount and increase the braking torque of the motor to reach the increased amount of regenerative braking, thereby increasing the deceleration to a certain extent.

Furthermore, when receiving the first manipulation signal from the first control information input device 122a as the first control information input device 122a is manipulated to be toggled once more, the vehicle may increase the increased amount of regenerative braking by the first amount and increase the braking torque of the motor to reach the further increased amount of regenerative braking, thereby further increasing the deceleration to a certain extent.

Accordingly, the vehicle may increase the amount of regenerative braking step by step by a certain amount based on the number of times of receiving the first manipulation signal according to manipulation of the first control information input device 122a, and reduce the amount of regenerative braking step by step by a certain amount based on the number of times of receiving the second manipulation signal according to manipulation of the second control information input device 122b.

When the first control information input device 122a is manipulated by holding operation, the vehicle may increase the amount of regenerative braking to correspond to the holding operation period, and when the second control information input device 122b is manipulated by holding operation, the vehicle may reduce the amount of regenerative braking to correspond to the holding operation period.

When receiving the first manipulation signal of the transmission lever 113, the vehicle may increase the current amount of regenerative braking by a first amount and increase the braking torque of the motor to reach the increased amount of regenerative braking, thereby increasing the deceleration to a certain extent.

When receiving the second manipulation signal of the transmission lever 113, the vehicle may reduce the current amount of regenerative braking by a first amount and reduce the braking torque of the motor to reach the reduced amount of regenerative braking, thereby reducing the deceleration to a certain extent.

Accordingly, the vehicle may increase the amount of regenerative braking step by step by a certain amount based on the number of times of receiving the first manipulation signal according to manipulation of the transmission lever 113, and reduce the amount of regenerative braking step by step by a certain amount based on the number of times of receiving the second manipulation signal according to manipulation of the transmission lever 113.

As such, switching the function of the control information input device, e.g., paddle, and transmission lever may increase usability of the control information input device and transmission lever.

The vehicle may shift down the gearshift level of the transmission by one step if it is determined that the target amount of regenerative braking is the second amount of regenerative braking, and to shift down the gearshift level of the transmission by one step if it is determined that the target amount of regenerative braking is the fourth amount of regenerative braking.

Furthermore, in controlling the amount of regenerative braking in response to manipulation of the first control information input device 122a, the vehicle may shift down the gearshift level of the transmission by one step when determining that a preset first period of time has elapsed from the start of controlling the amount of regenerative braking; the vehicle may shift down the gearshift level of the transmission by one step when determining that a preset second period of time has elapsed from the start of controlling the amount of regenerative braking; the vehicle may shift down the gearshift level of the transmission by one step when determining that a preset third period of time has elapsed from the start of controlling the amount of regenerative braking.

The vehicle may shift down the gearshift level of the transmission by one step whenever the first control information input device is manipulated.

When determining that the holding of the first control information input device 122a is released, if the current amount of regenerative braking is the maximum amount of regenerative braking, the vehicle reduces the braking torque of the motor to reduce the amount of regenerative braking to an amount one-step less than the maximum amount of regenerative braking, i.e., to the third amount of regenerative braking, thereby reducing the deceleration.

If the decreasing amount of regenerative braking reaches a first reference amount of regenerative braking, the vehicle maintains the target amount of regenerative braking at the first reference amount of regenerative braking.

Furthermore, if the decreasing amount of regenerative braking reaches the reference amount of regenerative braking, the vehicle may stop reducing the amount of regenerative braking and set the target amount of regenerative braking to the reference amount of regenerative braking.

The vehicle determines whether a function switching release signal is received in 234, and if it is determined that the function switching release signal is received, sets the function of the control information input device 122 to the function to manipulate the gearshift level, and switches the function to move the transmission lever 113 to the up- or down-shift level to the function to manipulate the gearshift level in 235.

When determining that the vehicle is stopped during the regenerative braking, the vehicle activates the EPB.

Specifically, when the target amount of regenerative braking is the maximum amount of regenerative braking, which is the fourth amount of regenerative braking, the vehicle may maintain the target amount of regenerative braking at the maximum amount of regenerative braking if a holding signal is received (F1) from the first control information input device 122a, activate the EPB if it is determined that the vehicle is stopped while maintaining the target amount of regenerative braking at the maximum amount of regenerative braking, output information about completion of activation of the EPB to guide the user to release the holding of the first control information input device 122a if it is determined that the activation of the EPB is finished.

Figure 12:
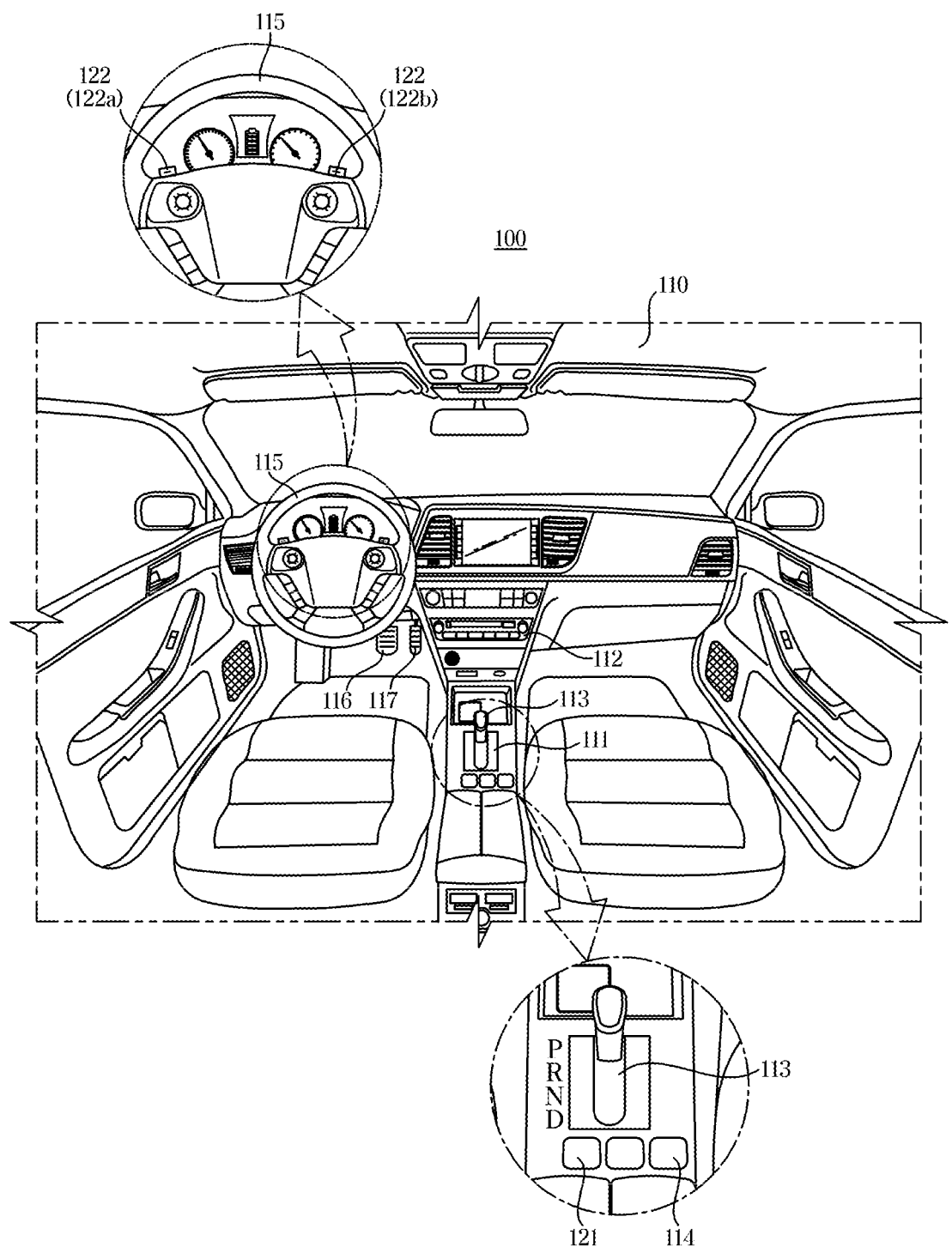
FIG. 12 shows an interior of the body of a vehicle according to another embodiment of the present disclosure.
Figure 14:
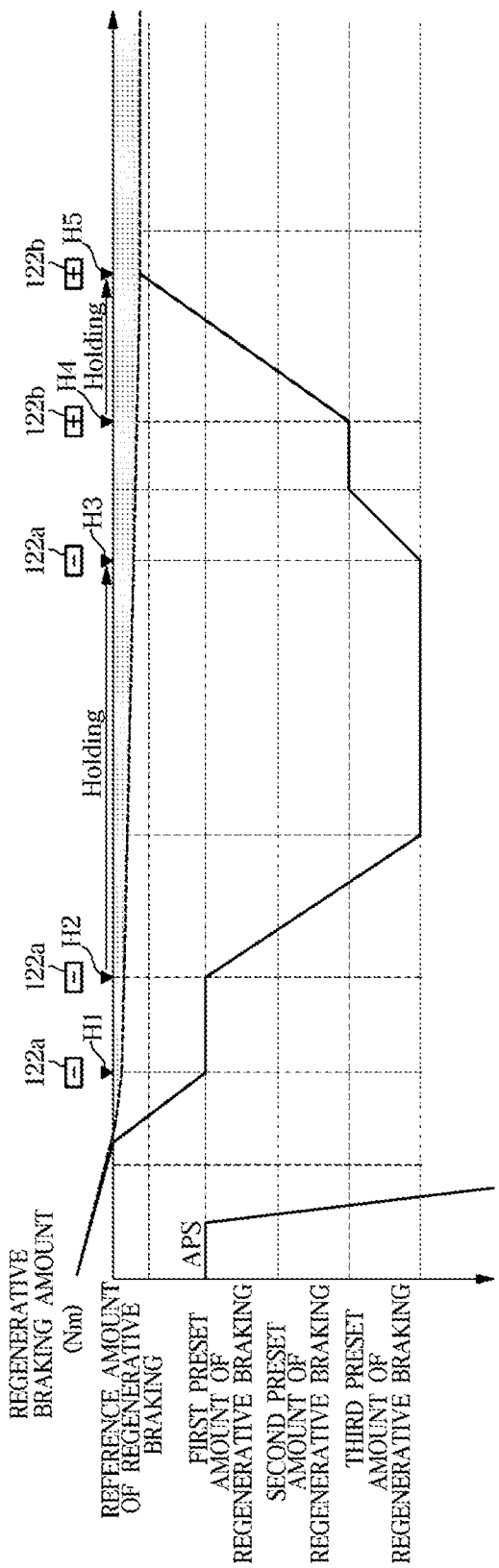
FIG. 14 shows the amount of regenerative braking controlled in response to manipulations of a control information input device of a vehicle, according to another embodiment of the present disclosure.

FIG. 12 shows the interior of a vehicle, according to another embodiment of the present disclosure, and FIG. 14 is a block diagram of a power system of a vehicle, according to an embodiment of the present disclosure.

In the embodiment of the present disclosure, assume that the vehicle is an eco-friendly vehicle, which is an electric vehicle including a rechargeable power system having a battery and a motor that rotates the motor with electricity stored in the battery and uses the rotation of the motor to drive the vehicle wheels.

Referring to FIG. 12, the vehicle 100 may further include the transmission lever 113 arranged on the center fascia 111, whose manipulation position of the transmission lever 113 is changed by the driver according to a driving condition and which receives an input of a gearshift mode, and the EPB button 114 placed around the transmission lever 113 or on the head unit 112 for receiving a command to operate the EPB button 114.

The vehicle 100 may include a steering wheel 115 of the steering system for controlling the driving direction, a brake pedal 116 pushed by the user who has intention of braking, and an accelerator pedal 117 pushed by the user who has intention of acceleration.

The vehicle 100 may further include an input device 120 for receiving commands to operate various functions.

The input device 120 may be arranged on the head unit 112, center fascia 111, and steering wheel 115 and may include at least one mechanical button, such as ON/OFF buttons for operation of various functions, buttons to change settings of various functions, etc.

The input device 120 may further include a jog dial (not shown) or a touch pad (not shown).

The input device 120 may include a mode input device 121 for receiving a driving mode and a control information input device 122 for receiving gearshift information and regenerative braking information.

The control information input device 122 may include a first control information input device 122a to increase braking power and increase the gearshift level, and a second control information input device 122b to reduce braking power and reduce the gearshift level.

The mode input device 121 may be arranged on the center fascia 111, and especially arranged around the transmission lever 113 or on the head unit 112.

The control information input device 122 may also be arranged on the steering wheel 115. The control information input device 122 may be provided as a paddle. Specifically, the first control information input device 122a may be provided as the first paddle located on the left of the steering wheel 115, and the second control information input device 122b may be provided as the second paddle located on the right of the steering wheel 115.

The vehicle 100 may further include a display 130 arranged in the head unit 112 for displaying information about an activated function and information input by the user.

The display 130 may display a driving mode corresponding to a first mode, i.e., eco mode, a second mode, i.e., sports mode, or a third mode, i.e., normal mode.

A chassis 140a of the vehicle 100 is a frame to support the vehicle body, having vehicle wheels 141a equipped at front and rear and on the left and right of the vehicle, power systems 142a, 143a, 144a, 146a to generate power for driving the vehicle 100 and controlling the generated power to apply the controlled power to the vehicle wheels 141a, a brake system for applying braking power to the vehicle wheels 141a, a steering system, and a suspension system arranged thereon.

The vehicle 100 may further include an EPB.

Figure 13:
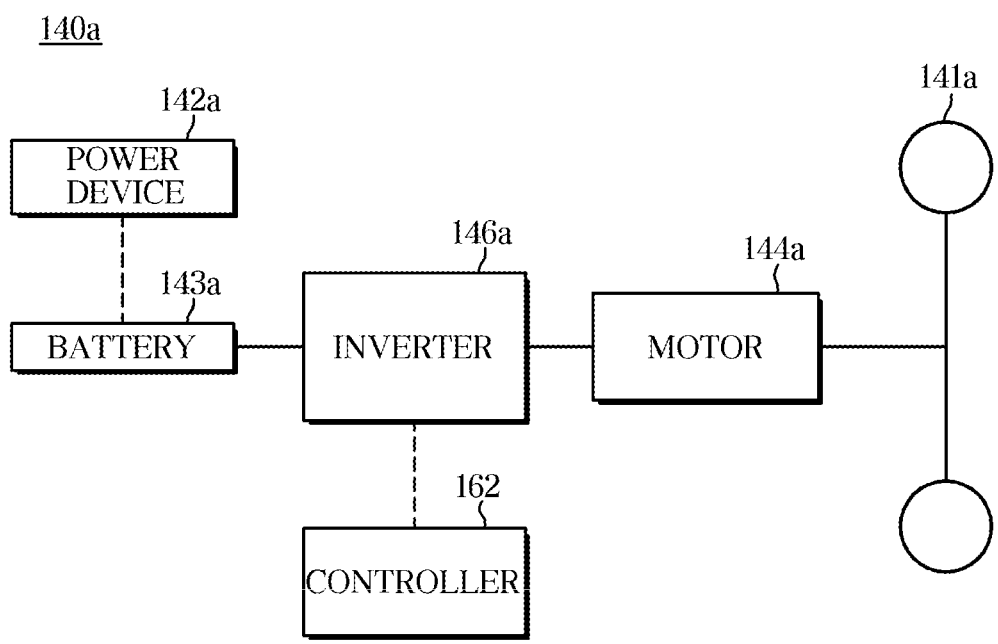
FIG. 13 is a block diagram of a power system of a vehicle, according to another embodiment of the present disclosure.

Referring to FIG. 13, the power system of the vehicle may include a power device 142a, a battery 143a, a motor 144a, and an inverter 146a, and may further include a speed reducer (not shown).

The power device 142a is to supply driving power to various loads in the vehicle, and may include a power converter (not shown) for converting external power to power required to charge the battery 143a and another power converter (not shown) for converting the external power to power required to drive the other loads.

The power converter converts the power supplied from the outside to power for charging the battery 143a and supplies the converted power to the battery 143a. The power supplied from the outside may be power from a charging station or power from a commercial power source provided in particular places.

The battery 143a supplies driving power to the motor 144a connected to the vehicle wheels for transmitting the rotation force to the vehicle wheels.

The battery 143a may be charged using power produced by the motor 144a driven in regenerative braking.

The motor 144a generates turning force using electric energy from the battery 143a, and transmits the turning force to the vehicle wheels 141a to drive the vehicle wheels 141a.

The inverter 146a converts the power from the battery 143a to driving power for the motor 144a.

The inverter 146a may be a bidirectional DC/AC inverter.

A controller 162 may control the motor 144 to reduce the rotation speed when the pressure on the accelerator pedal 117 is released.

When determining that neither the brake pedal nor the accelerator pedal is pushed, the controller 162 may determine that the vehicle is coasting, then determine target regenerative torque based on the rotation speed of the motor 144 and the road gradient and control the motor 144 based on the target regenerative torque. The target regenerative torque is less than reference regenerative torque.

The controller 162 may charge the battery 143a when the regenerative torque is produced by the motor 144a during coasting. The regenerative torque refers to the torque of the motor 144a that charges the battery 143a and corresponds to the amount of regenerative braking during regenerative braking.

The controller 162 may control the motor 144a to operate as a generator to perform regenerative braking during the coasting.

When the brake pedal 116 is pushed, the controller 162 controls the motor 144a to be operated as a generator by controlling the operation of the motor 144a such that the force acting on the motor 144a may work in the counter direction.

Specifically, when the motor 144a is used to generate braking power, the controller 162 may control the motor 144a to operate as a generator by cutting off power applied to the motor 144a and controlling the inverter 146a to have a current applied to the motor 144a flowing in the reverse direction. The rotation direction of the motor 144a is not changed due to the inertial force.

The controller 162 may determine a driving mode based on information input through the mode input device 121. For example, if the signal input through the mode input device 121 corresponds to the second mode, which is the sports mode, the controller 162 recognizes the driving mode to be the sports mode; if the signal input through the mode input device 121 corresponds to the eco mode, the controller recognizes the driving mode to be the eco mode; if the signal input through the mode input device 121 corresponds to the normal mode, the controller recognizes the driving mode to be the normal mode.

The controller 162 may control the deceleration of the motor and the amount of regenerative braking in reducing speed and applying the brake based on a driving mode.

The controller 162 may control increase of the amount of regenerative braking based on the first manipulation signal, and control reduction of the amount of regenerative braking based on the second manipulation signal.

It is also possible for the controller 162 to control the amount of regenerative braking based on manipulation information of the control information input device 122 only when the driving mode is the eco mode.

Specifically, the controller 162 may control braking torque of the motor to produce the reference amount of regenerative braking as the target amount of regenerative braking until a manipulation signal is received from the control information input device in the regenerative braking.

The controller 162 may control increase of the braking torque of the motor to increase the amount of regenerative braking by a certain amount when the first manipulation signal is received from the first control information input device 122a, and control reduction of the braking torque of the motor to reduce the amount of regenerative braking by a certain amount when the second manipulation signal is received from the second control information input device 122b.

The controller 162 may control increase of the braking torque of the motor to gradually increase the amount of regenerative braking when the first manipulation signal is consecutively received from the first control information input device 122a for a certain period of time, and control reduction of the braking torque of the motor to gradually reduce the amount of regenerative braking when the second manipulation signal is consecutively received from the second control information input device 122b for a certain period of time.

The first manipulation signal or second manipulation signal being consecutively received refers to a holding signal being received.

The controller 162 may increase the deceleration of the vehicle by increasing the braking torque of the motor and increase the amount of charge of the battery.

This will be described in connection with FIG. 14.

As shown in FIG. 14, when the accelerator pedal 117 is released from application of pressure, the controller 162 sets the target amount of regenerative braking to a reference amount of regenerative braking and controls operation of the motor such that the target amount of regenerative braking reaches the reference amount of regenerative braking.

The controller 162 may control the regenerative torque of the motor by controlling a current applied to the motor to flow in the reverse direction in order to reach the reference amount of regenerative braking, in which case if the first manipulation signal is received once (H1) from the first control information input device 122a, the controller 162 may set the target amount of regenerative braking to a first amount of regenerative braking increased by a first amount from the reference amount of regenerative braking and control the regenerative torque of the motor to reach the set first amount of regenerative braking.

If the first manipulation signal is consecutively received (H2) from the first control information input device 122a for more than a certain time, the controller 162 may control the braking torque of the motor to gradually increase the amount of regenerative braking. If the first manipulation signal is not received (H3), the controller 162 may determine an amount of regenerative braking at the time of not receiving the first manipulation signal. If the determined amount of regenerative braking is the maximum amount of regenerative braking, the controller 162 may reduce the braking torque of the motor to control the amount of regenerative braking to be reduced by one step. Furthermore, if the determined amount of regenerative braking is not the maximum amount of regenerative braking, the controller 162 may maintain the braking torque of the motor to maintain the current amount of regenerative braking.

If the second manipulation signal is consecutively received (H4) from the second control information input device 122b for more than a certain time, the controller 162 may control the braking torque of the motor to gradually reduce the amount of regenerative braking. If the second manipulation signal is not received (H5), the controller 162 may reduce the amount of regenerative braking until the time of not receiving the second manipulation signal.

Furthermore, if the reduced amount of regenerative braking is the reference amount of regenerative braking before the second manipulation signal is not received, the controller 162 may stop reducing the amount of regenerative braking and control the braking torque of the motor to maintain the reference amount of regenerative braking.

If the second manipulation signal is received from the second control information input device 122b during the regenerative braking, the controller 162 may set the current amount of regenerative braking to be reduced by a first amount, and control the regenerative torque of the motor to reach the set amount of regenerative braking.

Specifically, the controller 162 may reducing the amount of regenerative braking by a certain amount based on the number of times of receiving the second manipulation signal from the second control information input device 122b during the regenerative braking.

If the first manipulation signal is consecutively received from the first control information input device 122a for more than a certain period of time in a state of having the highest increase in amount of regenerative braking, the controller 162 may control operation of the EPB.

If the manipulation signal is consecutively received from the first control information input device 122a for more than a certain time in a state of having the highest increase in amount of regenerative braking and it is determined that the vehicle is stopped, the controller 162 may control an auto holding function.

It is also possible for the controller 162 to change the amount of regenerative braking to the reference amount of regenerative braking when receiving a release signal from the control information input device during the regenerative braking.

The release signal may include a signal generated when the transmission lever is positioned in the neutral level; a signal generated when the driving mode is changed to the sports mode; a signal generated when a SoC of the battery is higher than an allowed state; a signal generated when the battery temperature is higher than a first threshold temperature; a signal generated when the battery temperature is lower than a second threshold temperature.

The first threshold temperature is a temperature when the battery has high temperature, and the second threshold temperature is a temperature when the battery has extremely low temperature.

The controller 162 may limit increase in an amount of regenerative braking based on the SoC of the battery. Specifically, the controller 162 may change the maximum amount of regenerative braking corresponding to manipulation of the control information input device based on the SoC of the battery. The higher the SoC of the battery, the lower the maximum amount of regenerative braking.

The controller 162 may be implemented with a memory (not shown) storing an algorithm to control operation of the components in the vehicle 100 or data about a program that implements the algorithm, and a processor (not shown) carrying out the aforementioned operation using the data stored in the memory. The memory and the processor may be implemented in separate chips. Alternatively, the memory and the processor may be implemented in a single chip.

The controllers 162 may be an electronic control unit (ECU) for controlling driving of the vehicle, or one of a micro controller, a central processing unit (CPU), and a processor.

According to the present disclosure, optimal braking energy may be recovered by deriving proper deceleration with the motor without hydraulic braking force, and even for a transmission-less electric vehicle, fuel efficiency may be improved by more than 3.1%.

According to the present disclosure, manipulation of a control information input device, e.g., a paddle, provided on a steering wheel, may enable the vehicle speed to increase or decrease and a holding operation may enable the vehicle to be stopped, thereby increasing convenience in using the vehicle having a motor, and it is possible to increase an amount of regenerative braking during slowdown and braking of the vehicle, thereby improving fuel efficiency of the vehicle.

In other words, according to the present disclosure, regenerative braking may be optimized using acceleration/deceleration information through the control information input device without the need for the driver to manipulate a brake pedal and an accelerator pedal, and it is possible to consecutively perform regenerative braking in the entire driving zone, thereby maximizing energy storage through linear regenerative braking.

Furthermore, according to the present disclosure, optimal braking energy may be recovered by deriving proper deceleration with the motor without hydraulic braking force, and even for a transmission-less electric vehicle, fuel efficiency may be improved by more than 3.1%.

According to the present disclosure, the control information input device may diversify its function by being used as an input device for controlling manual transmission in a second mode, i.e., a sports mode, and as an input device for controlling an amount of regenerative braking in a first mode, i.e., an eco mode.

According to the present disclosure, the function of the control information input device may be automatically switched to the function of the input device for controlling transmission when the transmission lever is in the neutral position or the brake pedal is pushed or the driving mode is in the second mode, i.e., the sports mode, thereby improving user convenience.

As such, according to the present disclosure, the quality and commercial value of an eco-friendly vehicle may be improved, which leads to an increase of user satisfaction and improvement of reliability and safety of the vehicle, thereby securing competitiveness of the product.

Meanwhile, the embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A vehicle comprising:
 a motor;
 a transmission configured to transmit rotational motion of the motor to a vehicle wheel;
 a battery configured to supply power to the motor and be charged in regenerative braking;
 a mode input device configured to receive a driving mode;
 a control information input device configured to receive regenerative braking control information or gearshift level control information; and
 a controller configured to:
  control at least one of a braking torque of the motor and a gearshift level of the transmission to control a regenerative braking amount during the regenerative braking by recognizing a signal received from the control information input device as a signal corresponding to the regenerative braking control information when the driving mode received by the mode input device is a first mode, and
  control the transmission to control the gearshift level of the transmission by recognizing a signal received from the control information input device as a signal corresponding to the gearshift level control information when the driving mode input received by the mode input device is a second mode.

2. The vehicle of claim 1, wherein the control information input device comprises a first control information input device and a second control information input device arranged on a steering wheel and separated from each other by a certain distance.

3. The vehicle of claim 2, wherein the controller is configured to, while the driving mode is the first mode:
 increase the braking torque of the motor such that the regenerative braking amount increases, when a first manipulation signal is received from the first control information input device, and
 reduce the braking torque of the motor such that the regenerative braking amount decreases, when a second manipulation signal is received from the second control information input device.

4. The vehicle of claim 2, wherein the controller is configured to, while the driving mode is the first mode:
 when a first manipulation signal is consecutively received from the first control information input device for more than a preset amount of time, gradually increase the braking torque of the motor such that the regenerative braking amount increases to a preset amount of regenerative braking corresponding to the preset amount of time for which the first manipulation signal is consecutively received, and
 when a second manipulation signal is consecutively received from the second control information input device for more than a preset amount of time, gradually reduce the braking torque of the motor such that the regenerative braking amount gradually decreases,
 wherein the controller gradually increases the braking torque of the motor such that the regenerative braking amount increases to a first preset amount of regenerative braking when the first manipulation signal is consecutively received for more than a first preset amount of time, and
 the controller gradually increases the braking torque of the motor such that the regenerative braking amount increases to a second preset amount of regenerative braking, which is different from the first preset amount of regenerative braking, when the first manipulation signal is consecutively received for more than a second preset amount of time.

5. The vehicle of claim 4, wherein the controller is configured to:
 when the regenerative braking amount increased depending upon the preset amount of time for which the first manipulation signal is consecutively received reaches a maximum amount of regenerative braking, stop increasing and maintain the regenerative braking amount at the maximum amount of regenerative braking, and
 when the regenerative braking amount reduced depending upon the preset amount of time for which the second manipulation signal is consecutively received reaches a reference amount of regenerative braking, stop reducing and maintain the regenerative braking amount at the reference amount of regenerative braking.

6. The vehicle of claim 2, wherein the controller is configured to, while the driving mode is the second mode:
 control the transmission to reduce the gearshift level when a first manipulation signal is received from the first control information input device, and
 control the transmission to increase the gearshift level when a second manipulation signal is received from the second control information input device.

7. The vehicle of claim 2, wherein the controller is configured to, while the driving mode is the first mode:
 control operation of the transmission to increase deceleration based on a first preset gearshift pattern such that the regenerative braking amount increases, when a first manipulation signal is received from the first control information input device, and control operation of the transmission to reduce deceleration based on a second preset gearshift pattern such that the regenerative braking amount decreases, when a second manipulation signal is received from the second control information input device.

8. The vehicle of claim 2, wherein the controller is configured to, while the driving mode is the first mode:

when a first manipulation signal is received from the first control information input device, control operation of the transmission to gradually increase deceleration based on a preset amount of time for which the first manipulation signal is consecutively received such that the regenerative braking amount gradually increases, and when a second manipulation signal is received from the second control information input device, control operation of the transmission to gradually reduce deceleration based on a preset amount of time for which the second manipulation signal is consecutively received such that the regenerative braking amount gradually decreases.

9. The vehicle of claim 1, wherein the controller is configured to set a target regenerative braking power to a reference regenerative braking power until a manipulation signal is received from the control information input device during the regenerative braking and to control the braking torque of the motor based on the set reference regenerative braking power.

10. The vehicle of claim 1, further comprising:

a transmission lever configured to receive a manipulation signal of an up-shift level or a down-shift level; and a transmission signal receiver configured to receive a first manipulation signal corresponding to the down-shift level and a second manipulation signal corresponding to the up-shift level, wherein the controller is configured to control the transmission to reduce the gearshift level when receiving the first manipulation signal and to control the transmission to increase the gearshift level when receiving the second manipulation signal.

11. The vehicle of claim 10, further comprising a function switching input device, wherein when an ON signal is received from the function switching input device, the controller:

controls the braking torque of the motor to increase the regenerative braking amount during the regenerative braking by recognizing the first manipulation signal corresponding to the down-shift level as a signal of increasing the regenerative braking amount, and controls the braking torque of the motor to reduce the regenerative braking amount during the regenerative braking by recognizing the second manipulation signal corresponding to the up-shift level as a signal of reducing the regenerative braking amount.

12. The vehicle of claim 11, wherein the controller is configured to, when a function switching release signal is received, recognize a signal received from the control information input device as a signal corresponding to the gearshift level control information, and to recognize a signal received from the transmission signal receiver as a signal corresponding to the gearshift level control information.

13. The vehicle of claim 1, wherein the controller is configured to, when a function switching release signal is received, recognize a signal received from the control information input device as a signal corresponding to the gearshift level control information.

14. The vehicle of claim 1, further comprising: a detector configured to detect pressure applied on each of an accelerator pedal and a brake pedal, wherein the controller is configured to control the regenerative braking when determining based on information detected by the detector that the accelerator pedal and the brake pedal are not in a pressed state.

15. The vehicle of claim 1, further comprising: a detector for detecting driving speed, wherein the controller is configured to:

determine based on information detected by the detector whether the vehicle is in a stopped state, determine whether a signal of increasing the regenerative braking amount is consecutively received from the control information input device for more than a preset amount of time when the vehicle is determined to be in the stopped state, and control operation of an electronic parking brake system when it is determined that the signal of increasing the regenerative braking amount is received from the control information input device for more than the preset amount of time.

16. The vehicle of claim 1, wherein the controller is configured to control the transmission to reduce the gearshift level of the transmission during the regenerative braking based on a period of time for which the regenerative braking is performed.

17. The vehicle of claim 1, wherein the controller is configured to control the transmission to reduce the gearshift level of the transmission during the regenerative braking based on a target amount of regenerative braking.

18. The vehicle of claim 1, wherein the controller is configured to control the transmission to reduce the gearshift level of the transmission whenever a signal of increasing the regenerative braking amount is received from the control information input device during the regenerative braking.

19. A vehicle comprising:

a motor coupled to a vehicle wheel;

a battery configured to supply power to the motor and be rechargeable;

a control information input device configured to receive regenerative braking control information; and a controller configured to:

set a target amount of regenerative braking to a reference amount of regenerative braking during deceleration or braking, set the target amount of regeneration braking to a preset amount of regenerative braking higher than the reference amount of regenerative braking when receiving a manipulation signal from the control information input device, and control braking torque of the motor based on the set target amount of regenerative braking.

20. The vehicle of claim 19, wherein:

the control information input device comprises a first control information input device and a second control information input device arranged on a steering wheel and separated from each other by a certain distance, and the controller is configured to increase the braking torque of the motor to increase an amount of regenerative braking when a first manipulation signal is received from the first control information input device, and to reduce the braking torque of the motor to reduce an amount of regenerative braking when a second manipulation signal is received from the second control information input device.

21. The vehicle of claim 20, wherein the controller is configured to:
when the first manipulation signal is consecutively received from the first control information input device for more than a preset amount of time, gradually increase the braking torque of the motor such that the regenerative braking amount gradually increases to a preset amount of regenerative braking corresponding to the preset amount of time for which the first manipulation signal is consecutively received, and
when the second manipulation signal is consecutively received from the second control information input device for more than a preset amount of time, gradually reduce the braking torque of the motor such that the regenerative braking amount gradually decreases.

22. The vehicle of claim 21, wherein the controller is configured to:
when the regenerative braking amount increased depending upon the preset amount of time for which the first manipulation signal is consecutively received reaches a maximum amount of regenerative braking, stop increasing and maintain the regenerative braking amount at the maximum amount of regenerative braking; and
when the regenerative braking amount reduced depending upon the preset amount of time for which the second manipulation signal is consecutively received reaches a reference amount of regenerative braking, stop reducing and maintain the regenerative braking amount at the reference amount of regenerative braking.

23. A method for controlling a vehicle having a motor, a transmission, and a battery, the method comprising steps of:
controlling a regenerative braking amount during regenerative braking by recognizing a signal received from a first or second control information input device arranged on a steering wheel as a signal corresponding to regenerative braking control information, when a driving mode is a first mode; and
controlling the transmission to control a gearshift level of the transmission by recognizing a signal received from the first or second control information input device as a signal corresponding to gearshift level control information, when a driving mode is a second mode.

24. The method of claim 23, wherein the step of controlling the regenerative braking amount comprises:
at least one of a step of increasing braking torque of the motor or a step of reducing the gearshift level of the transmission such that the regenerative braking amount increases, when a first manipulation signal is received from the first control information input device; and
a step of reducing the braking torque of the motor such that the regenerative braking amount decreases, when a second manipulation signal is received from the second control information input device.

25. The method of claim 23, wherein the step of controlling the regenerative braking amount comprises:
when a first manipulation signal is consecutively received from the first control information input device for more than a preset amount of time, gradually increasing the regenerative braking amount to a preset amount of regenerative braking corresponding to the preset amount of time for which the first manipulation signal is consecutively received, and
when a second manipulation signal is consecutively received from the second control information input device for more than a preset amount of time, gradually reducing the regenerative braking amount.

26. The method of claim 23, further comprising:
when an ON signal is received from a function switching input device,
increasing the regenerative braking amount during the regenerative braking by recognizing a first manipulation signal corresponding to a down-shift level of a transmission lever as a signal of increasing the regenerative braking amount; and
reducing the regenerative braking amount during the regenerative braking by recognizing a second manipulation signal corresponding to an up-shift level of the transmission lever as a signal of reducing the regenerative braking amount.

27. The method of claim 23, further comprising:
determining based on information detected by a detector whether the vehicle is in a stopped state;
determining whether a first manipulation signal is consecutively received from the control information input device for more than a preset amount of time when the vehicle is determined to be in the stopped state; and
controlling operation of an electronic parking brake system when it is determined that the first manipulation signal is consecutively received from the control information input device for more than the preset amount of time.

* * * * *